(12) United States Patent
Soualle et al.

(10) Patent No.: US 11,378,698 B2
(45) Date of Patent: Jul. 5, 2022

(54) GROUND TIME VIRTUALLY REFERENCED POSITIONING AND TIMING SYSTEM

(71) Applicant: Airbus Defence and Space GmbH, Taufkirchen (DE)

(72) Inventors: Francis Soualle, Munich (DE); Jean-Jacques Floch, Munich (DE); Thomas Bey, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 300 days.

(21) Appl. No.: 16/561,900

(22) Filed: Sep. 5, 2019

(65) Prior Publication Data

US 2020/0081132 A1  Mar. 12, 2020

(30) Foreign Application Priority Data

Sep. 6, 2018 (EP) .................................. 18192934

(51) Int. Cl.
| | |
|---|---|
| *G01S 19/25* | (2010.01) |
| *G01S 19/07* | (2010.01) |
| *G01S 19/42* | (2010.01) |
| *G01S 19/30* | (2010.01) |
| *H04B 1/7073* | (2011.01) |

(52) U.S. Cl.
CPC .......... *G01S 19/256* (2013.01); *G01S 19/072* (2019.08); *G01S 19/254* (2013.01); *G01S 19/30* (2013.01); *G01S 19/42* (2013.01); *H04B 1/7073* (2013.01)

(58) Field of Classification Search
CPC .... G01S 19/072; G01S 19/254; G01S 19/256; G01S 19/30; G01S 19/42; H04B 1/7073
See application file for complete search history.

(56) References Cited

U.S. PATENT DOCUMENTS

| | | |
|---|---|---|
| 5,886,666 A | 3/1999 | Schellenberg et al. |
| 2004/0201519 A1 | 10/2004 | Aoki et al. |
| 2005/0159891 A1 | 7/2005 | Cohen et al. |

FOREIGN PATENT DOCUMENTS

WO  2012001665 A1  1/2012

OTHER PUBLICATIONS

Extended European Search report from corresponding European application No. 18192934.0, dated Mar. 21, 2019.

*Primary Examiner* — Dao L Phan
(74) *Attorney, Agent, or Firm* — Greer, Burns, & Crain, Ltd.

(57) ABSTRACT

A platform with a signal generation unit and a transmitting unit. The signal generation unit is adapted to generate a spreading code sequence. The spreading code sequence has a reference chip with a rising edge and a falling edge. The signal generation unit is adapted to adjust the spreading code sequence to ensure that the rising edge or the falling edge of the reference chip arrives at a Virtual Timing Reference Station, VTRS, on a predetermined time ($t_{ref,VTRS}$). The transmitting unit is adapted to engage with the signal generation unit and adapted to transmit the spreading code sequence. Further, a user device for receiving the transmitted spreading code sequence.

18 Claims, 37 Drawing Sheets

GROUND TIME VIRTUALLY REFERENCED POSITIONING AND TIMING SYSTEM

CROSS-REFERENCES TO RELATED APPLICATIONS

This application claims priority from European Patent Application No. 18192934.0 filed Sep. 6, 2018, the entirety of which is incorporated herein by reference.

FIELD OF THE INVENTION

Examples relate to concepts for providing ground time virtually referenced positioning and timing systems and applications thereof and in particular to a platform for providing a user device with a spreading code sequence.

BACKGROUND OF THE INVENTION

A general problem in navigation is that a user needs to determine its position based on the signal transmitted by "conventional" Global or Regional Satellite Navigation Systems (GNSS/RNSS) which requires at least four (4) Lines-of-Sight (LoS): three (3) in order to determine its geometrical coordinates (X-, Y- and Z) and one (1) additional to determine its clock offset, with respect to the time scale of the GNSS or RNSS.

A requirement for determination of its position is an availability of four (4) LoS. This is not difficult in an environment where the optical horizon is not obstructed by obstacles (for example trees or buildings). However, this situation is not ensured in other environments such as in urban areas.

Position determination techniques may have to be optimized with respect to environments such as urban areas. Nevertheless, it is desired to enhance an acquisition phase of a user device.

There may be a demand to provide concepts for platforms providing a spread code sequence to user devices with an enhance acquisition phase.

SUMMARY OF THE INVENTION

Such a demand may be satisfied by the subject-matter of the present application.

According to a first aspect, a platform is provided. The platform comprises a signal generation unit and a transmitting unit. The signal generation unit is adapted to generate a spreading code sequence. The spreading code sequence has a reference chip with a rising edge and a falling edge. The signal generation unit is adapted to adjust the spreading code sequence to ensure that the rising edge or the falling edge of the reference chip arrives at a (dedicated) Virtual Timing Reference Station, VTRS, on (or at) a predetermined time ($t_{ref,VTRS}$). The transmitting unit is adapted to engage with the signal generation unit and adapted to transmit the spreading code sequence.

The arrival of the rising edge or the falling edge of the reference chip may be ensured for different (time) points, such that at different points in space, especially airspace or biosphere, the platform is able by transmitting the spreading code sequence to provide the rising edge or the falling edge of the reference chip to the VTRS. The VTRS may represent an artificial or virtual location used for the synchronization at reception. Thus, the VTRS may be understood as virtual point in space, especially airspace and/or biosphere, which can be seen by a user device, such as a usual user equipment.

The signal generation unit may be adapted to apply a code and doppler compensation. Consequently, the acquisition of the user device may be facilitated by reducing the number of Code and Doppler hypotheses to be tested.

The VTRS may form a center of a cell. The spreading code sequence may be adjusted such that each reference chip of the spreading code sequence corresponds to one VTRS.

The VTRS may be part of a set of multiple VTRSs. Each VTRS of the set of the multiple VTRSs may form a center of a cell. The spreading code sequence may be adjusted such that each reference chip of the spreading code sequence corresponds to another one of the set of VTRSs.

The VTRS may be a virtual point on earth or space, in particular biosphere or airspace. The VTRS can also be a specific three dimensional coordinate having a fourth coordinate for a specific time, for example the predetermined time $t_{ref,VTRS}$. Thus, a trajectory of a number of VTRSs or a single moving VTRS is possible. For a specific time point, a specific three dimensional coordinate applies for the VTRS. The same applies mutatis mutandis to the set of VTRSs. Thus, a user device may be provided beforehand with sufficient information in order to deduce its coarse position.

The signal generation unit may be adapted to consider a clock offset between a system time of a corresponding Global Navigation Satellite System, GNSS, and the signal generation unit. Thus, the clock offset may not need to be performed by the user device later on. The signal generation unit may be adapted to consider a geometrical distance between the platform and the VTRS. The signal generation unit may be adapted to compensate for the clock offset between a satellite local time and a system time of the corresponding Global Navigation Satellite System, GNSS.

The signal generation unit may be adapted to consider tropospheric and ionospheric delay at the VTRS on the predetermined time ($t_{ref,VTRS}$). The same applies mutatis mutandis for the set of VTRSs. The signal generation unit may be adapted to compensate for the tropospheric and ionospheric delay at the VTRS on the predetermined time ($t_{ref,VTRS}$).

The signal generation unit may be adapted to adjust the spreading code sequence to ensure that the rising edge or the falling edge of the reference chip arrives at other Virtual Timing Reference Stations, VTRSs, at different predetermined times. A length of the spreading code sequence is based on a shortest distance between VTRSs of the set of VTRSs. The set of VTRSs may comprise the VTRS and the other VTRSs. The length of the spreading code sequence may determine a density of the set of VTRSs.

The transmitted spreading code sequence comprises a spreading code counter which comprises a number of spreading codes starting from a first spreading code which comprises the reference chip. The reference chip may be one of several reference chips. The several reference chips may be adjusted by the signal generation unit to correspond to respective VTRSs of the set of VTRSs.

The signal generation unit may be adapted to compensate Doppler at the VTRS. The same applied mutatis mutandis to the set of VTRSs. Thus, Doppler (ambiguity) may be compensated not with respect to the user device, but with respect to the VTRS (at a different point in space). The VTRS may be different from the position of the user device.

The VTRS may be a moving point and not a fixed point on earth. The set of VTRSs can be a net of different three dimensional points on earth and/or near earth, for example in the air.

The platform may be a space-based station. The platform may be a Navigation Satellite at a Medium Earth Orbit (MEO). The platform may be a Low Earth Obit (LEO). The platform may be a GEO stationary satellite (GEO).

The platform may be a near earth platform. The platform may be a High-Altitude Platform (HAPS). The platform may be a (stratospheric) Balloon or a Drone.

The platform may be a static terrestrial platform. The platform may be a Base Transceiver Stations (BTS). The BTS may be adapted for terrestrial mobile network infrastructures. The platform may be a terrestrial Navigation Beacon. The platform may be a Pseudo-satellite or Pseudolite.

According to a second aspect, a user device is provided. The user device is adapted to receive the spreading code sequence from the platform according to the first aspect. The user device is adapted to perform acquisition based on the spreading code sequence, wherein the VTRS (with its position and time) is a priori known by the user device.

The VTRS may form a trajectory which is known to the user device, wherein an exact position on the trajectory is known, which corresponds to an arrival of the reference chip of the spreading code sequence. Further, the set of VTRS s can also be known a priori by the user device.

The corresponding compensation may be calculated with respect to the so-called Virtual Reference Time Station (VTRS). In particular, the code compensation may be derived by ensuring that the rising edge (or the falling edge, depending on convention) of the reference chip (for example the first chip depending on convention), of the spreading code sequence arrives at the specific epoch $t_{ref,VTRS}$ at the VTRS. The term "specific epoch" may be also used herein as the term "predetermined time". In that way, it is then possible for the user device to be synchronized to the system time, with a very high accuracy, once having acquired the corresponding signal. This fast acquisition may be eased by the reduced number of code and Doppler hypotheses to be tested thanks to the code and Doppler compensation.

Each VTRS of the set of VTRSs may correspond to the center of a cell, using the same terminology, as for communication systems. The length of the spreading code modulated onto the navigation signal may be dimensioned with respect to the inter-cell distance. To ease solving the ambiguity between the spreading sequence which is used to acquire the navigation signal and the first spreading sequence whose first chip (e.g.) is used to synchronize at VTRS at $t_{Ref,vtrs}$, a spreading code counter may be modulated, either directly modulated onto the navigation signal, as part of the navigation message, or using a so-called Code Shift Keying technique. The spreading code sequence may consequently be part of a navigation signal being transmitted by the signal generation unit.

The user device may have knowledge on the exact position of the VTRS as well as the reference time, $t_{ref,VTRS}$. Such information can be made available in a former message to the user and thus actualized, or hardcoded in the user device and/or made available to the user via a third communication channel such as internet. In case of (a network of) cells, the user device may then know the exact position of each of the cell centers, as well as the reference arrival time $t_{ref,VTRS}$ for each of the cell centers. It is also possible to consider that the VTRS follows a predefined trajectory, known by the user device as well, and that the reference time $t_{ref,VTRS}$ is also known when the VTRS is at a predefined position within its trajectory.

It is possible (but not mandatory) to also incorporate the ionospheric and tropospheric error, delay, into the compensation. By doing so, it is possible to also reduce their effects at the user device. The farther the user is away from the VTRS, the larger the magnitude of a corresponding residual for the ionospheric and tropospheric error.

Because the calculation of the code compensation may incorporate the clock offset of the transmission source, for example a navigation satellite, then the corresponding model does not need to be modulated onto the navigation message which corresponds to a substantial reduction of the navigation message size.

Consequently, the present disclosure provides a technique which may significantly reduce the time to acquire by reducing the code and Doppler uncertainty search. The reduction in code search may reduce to a few micros, i.e. chip when the satellite is at zenith of the VTRS and the user is close to it (usually the code search span over several milliseconds). When applying the Doppler compensation, the number of Doppler hypotheses to be tested may reduce to a number between 6 to 12. Combining the reduction of code and Doppler hypotheses may yield to a significant reduction of the code and Doppler search space, which can be compared to warm or hot acquisition conditions, even if the user has no knowledge of system time and satellite position.

At the end, the code and Doppler uncertainty search may reduce to the one caused by the contribution of the local user oscillator, having especially a reduced stability.

It is shown that the higher the elevation of the satellite with respect to the VTRS, the closer the user device may be to the VTRS and the higher the satellite altitude Amy be and the better the acquisition performances, as well as time transfer performances, may be.

By incorporating the Ionospheric and Tropospheric delay, the contribution of atmosphere onto the pseudo-range may become negligible for any user located in the vicinity of the VTRS.

When integrating the satellite clock offset into the determination of the code compensation, the user navigation message does not need to modulate the corresponding prediction model for the satellite clock offset. This yields to a substantial reduction of the required navigation message size (estimated to ⅓ of the overall message comprising usually both orbit and clock prediction models).

According to a third aspect, a system may be provided which comprises the platform according to the first aspect and the user device according to the second aspect. The user device may be adapted to use the information about the VTRS(s) and compute in an acquisition phase a first hypothesis based on the VTRS(s). Consequently, a time for acquisition may be reduced because of a better starting point for computing the first hypothesis needed for acquisition and start of a tracking phase for the user device.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the user device, the platform, the signal generation unit and the transmitting unit may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details is described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the platform, these aspects may also apply to the user device and the system. Likewise, the aspects described above in relation to the user device may be applicable in a corresponding manner to the platform and the system. Further, the aspects described above in relation to the system may be applicable in a corresponding manner to the platform and the user device.

It is also to be understood that the terms used herein are for the purpose of describing individual embodiments and are not intended to be limiting. Unless otherwise defined, all technical and scientific terms used herein have the meaning which corresponds to the general understanding of the skilled person in the relevant technical field of the present disclosure; they are to be understood to be neither too far nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as e.g. "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

BRIEF DESCRIPTION OF THE DRAWINGS

In the following, the preferred embodiments of the present disclosure are described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

Figure 1:
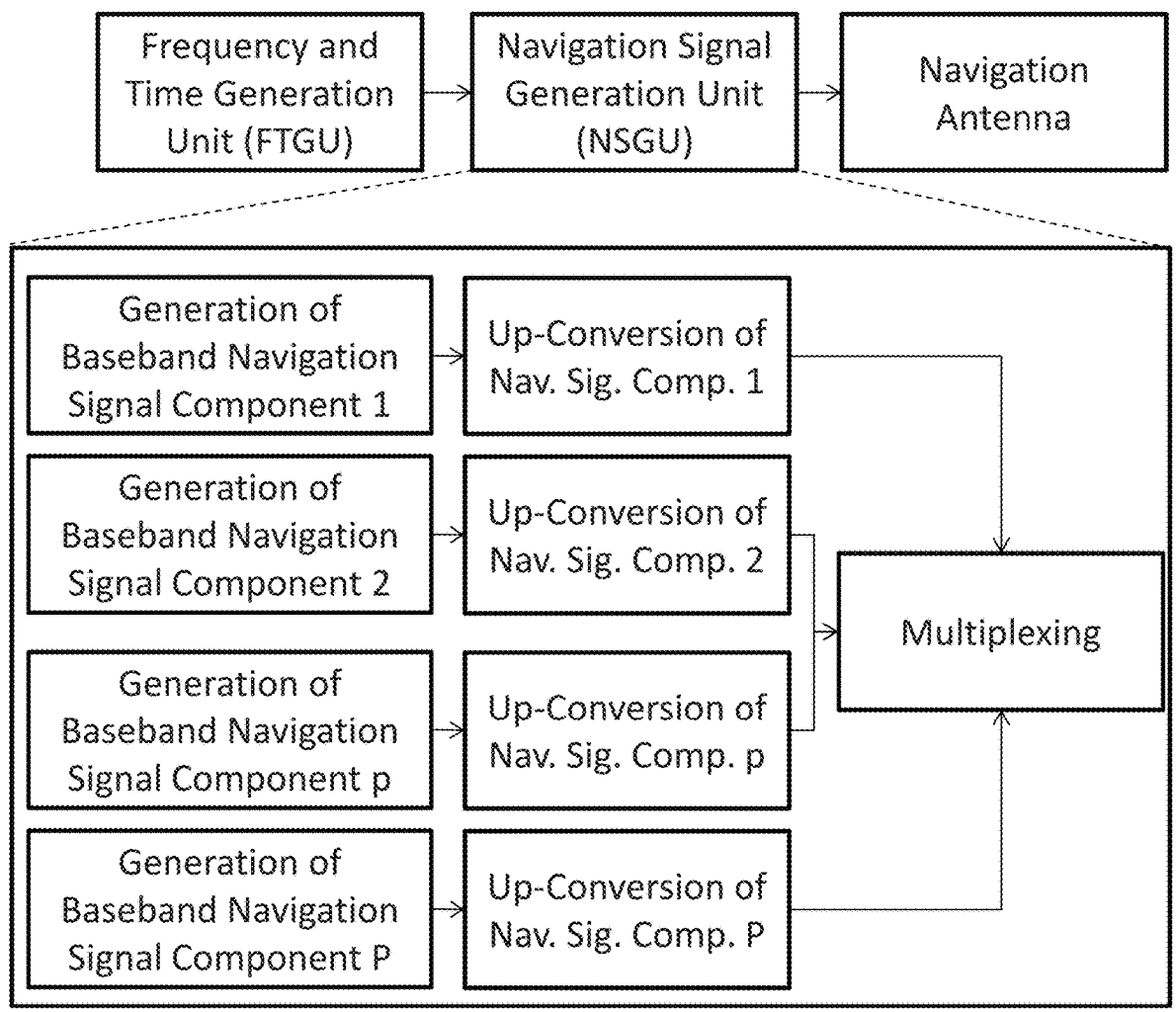

Other objects, features, advantages and applications become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

Figure 2:
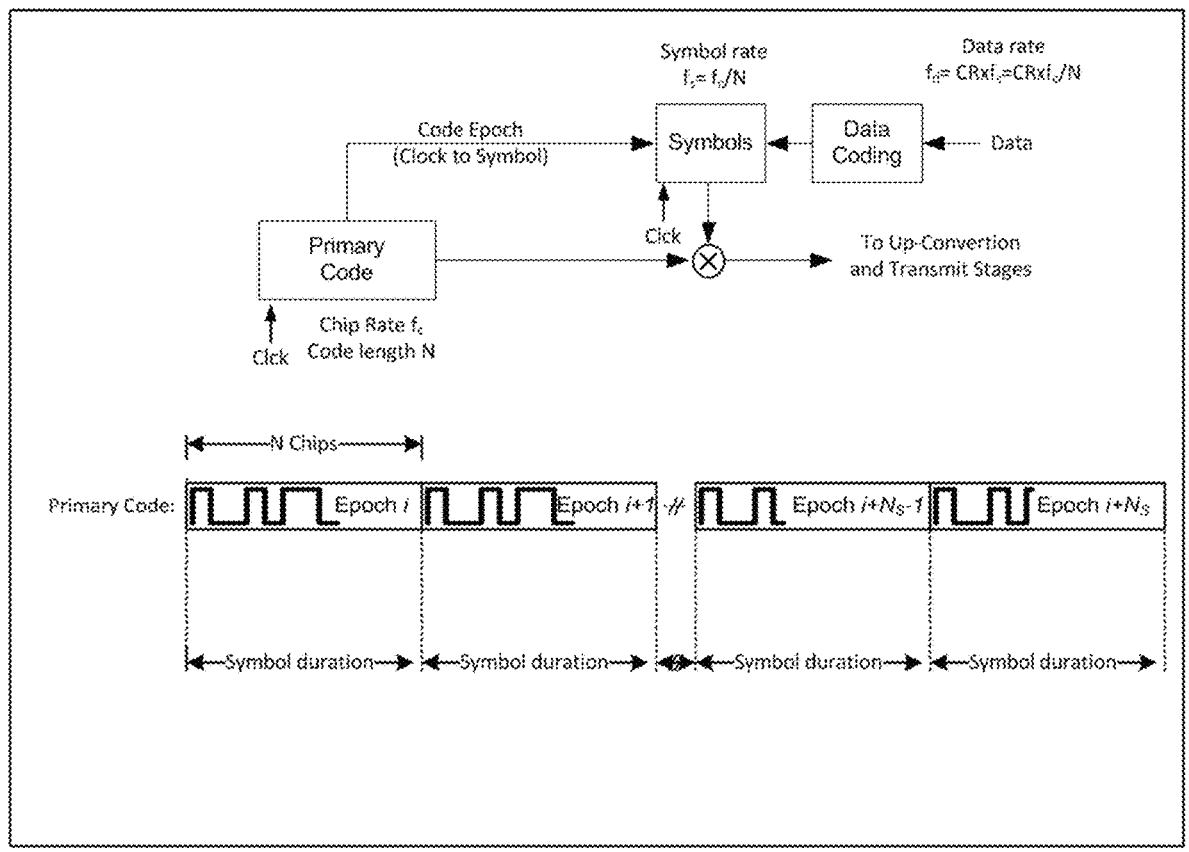
Figure 3:
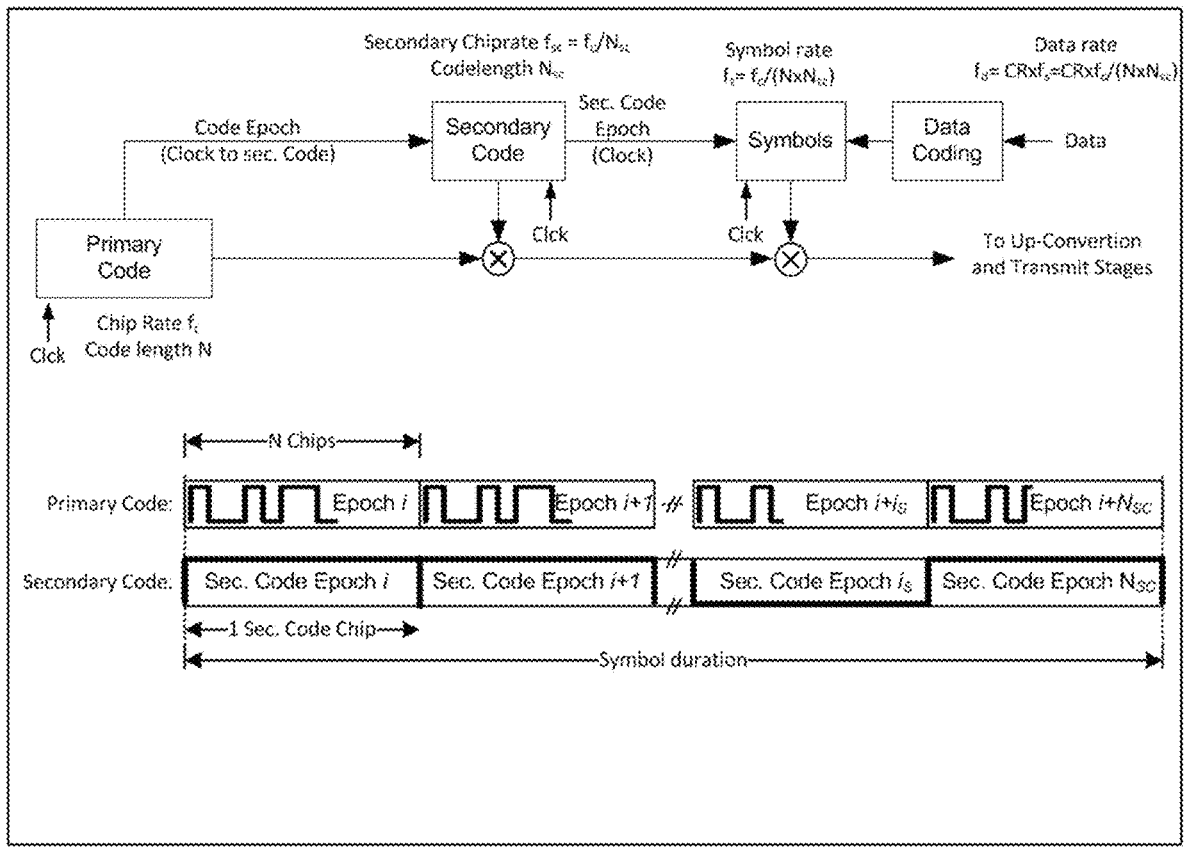
Figure 4:
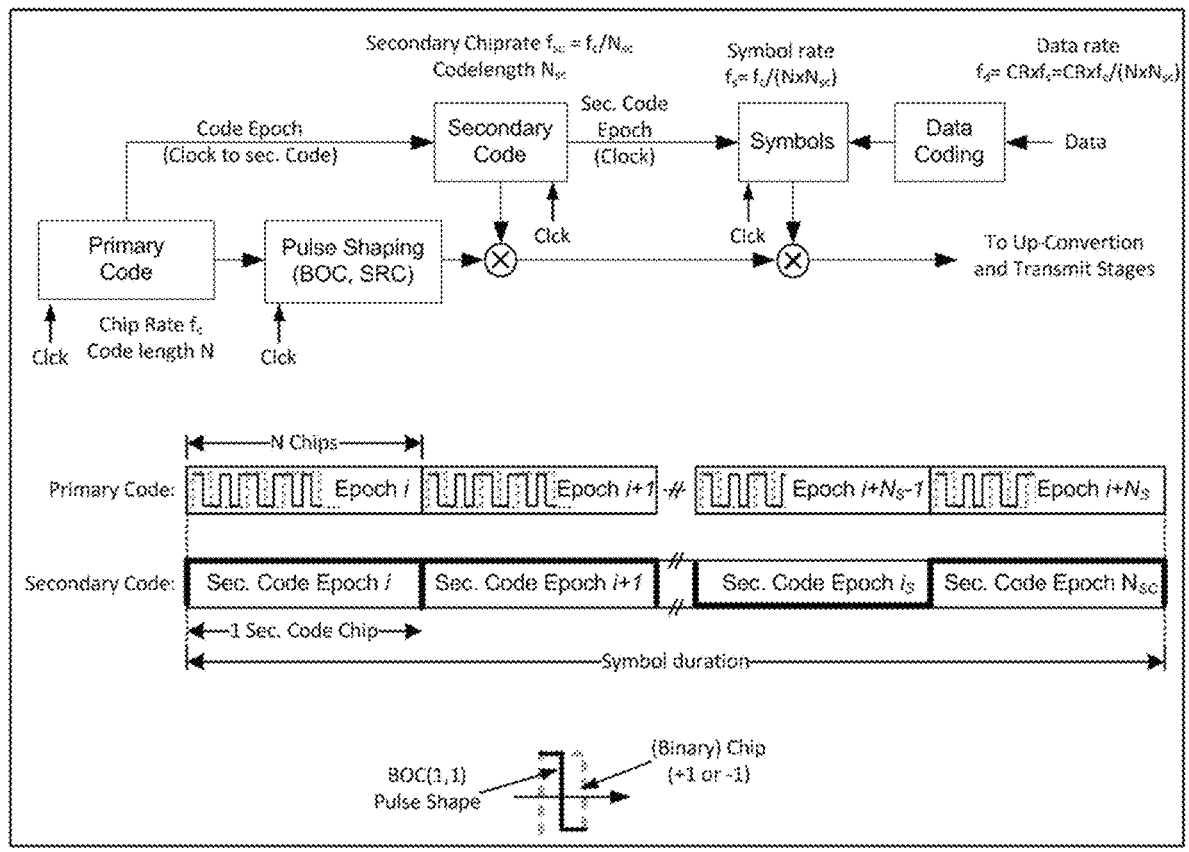
Figure 5:
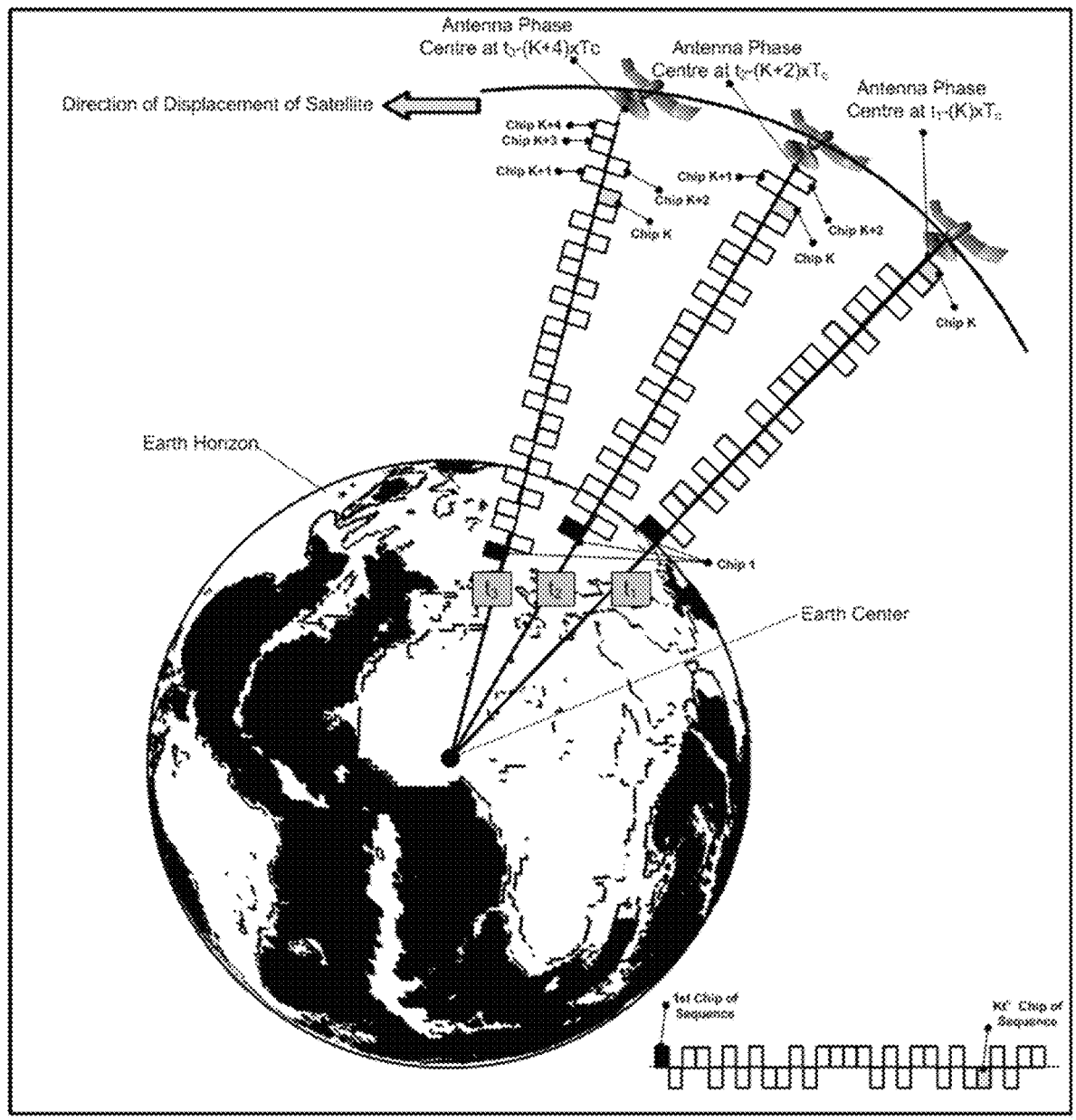
Figure 6:
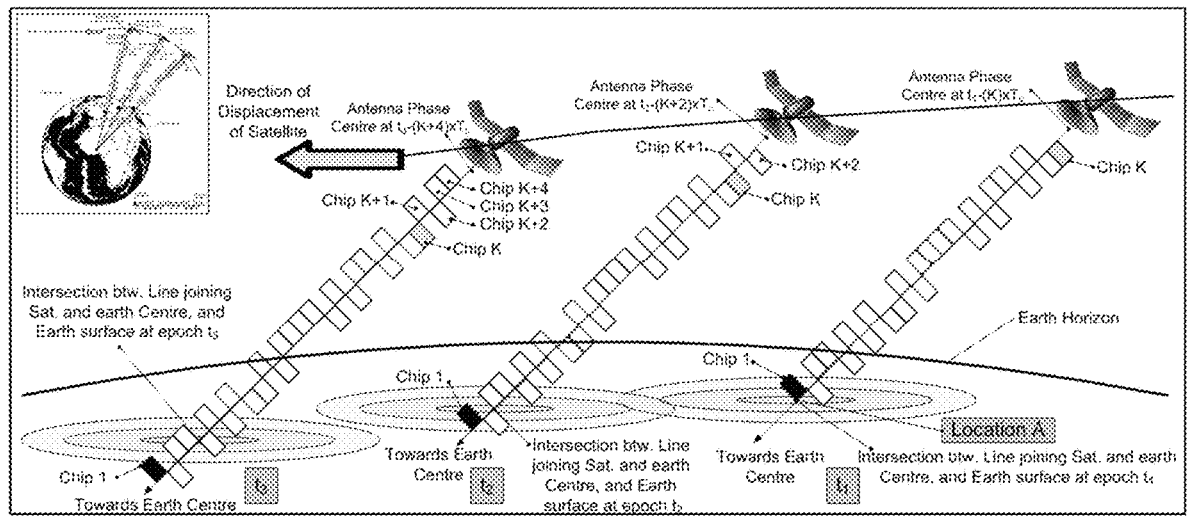
Figure 7:
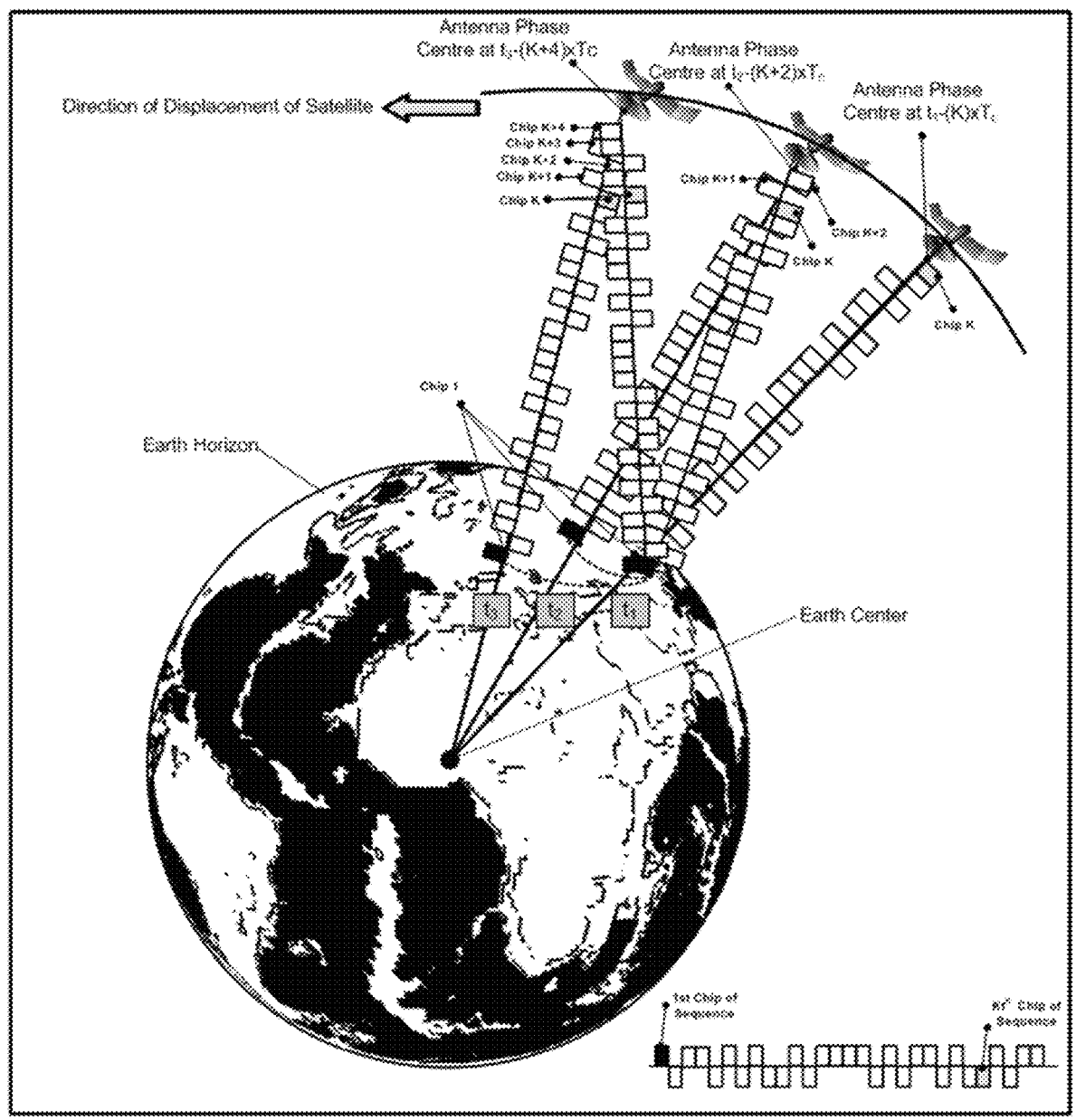
Figure 8:
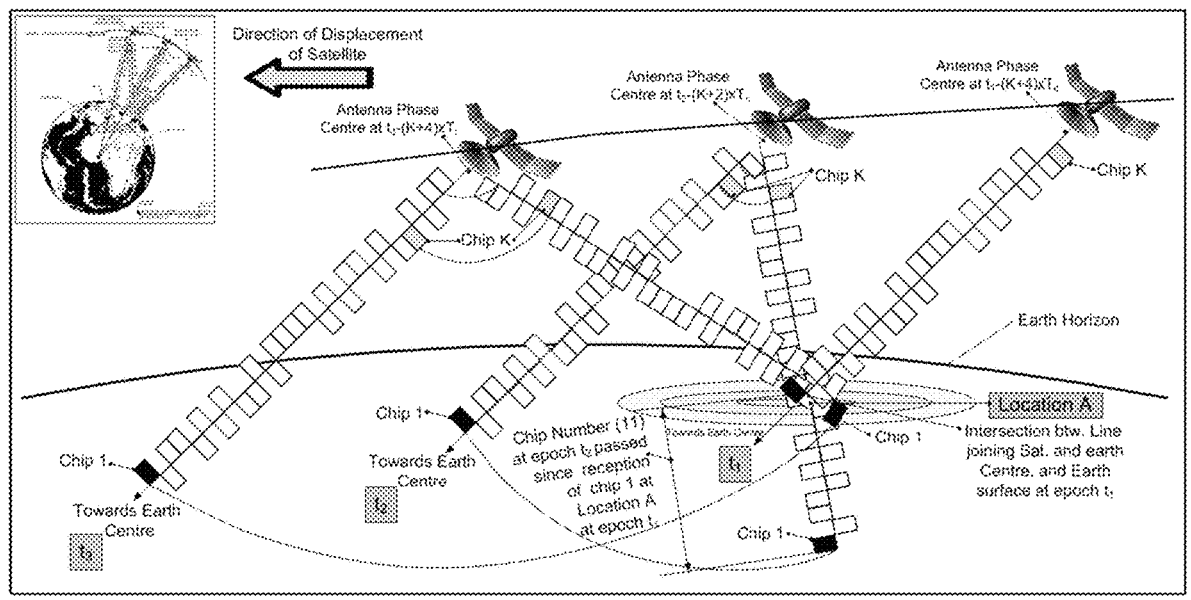
Figure 9:
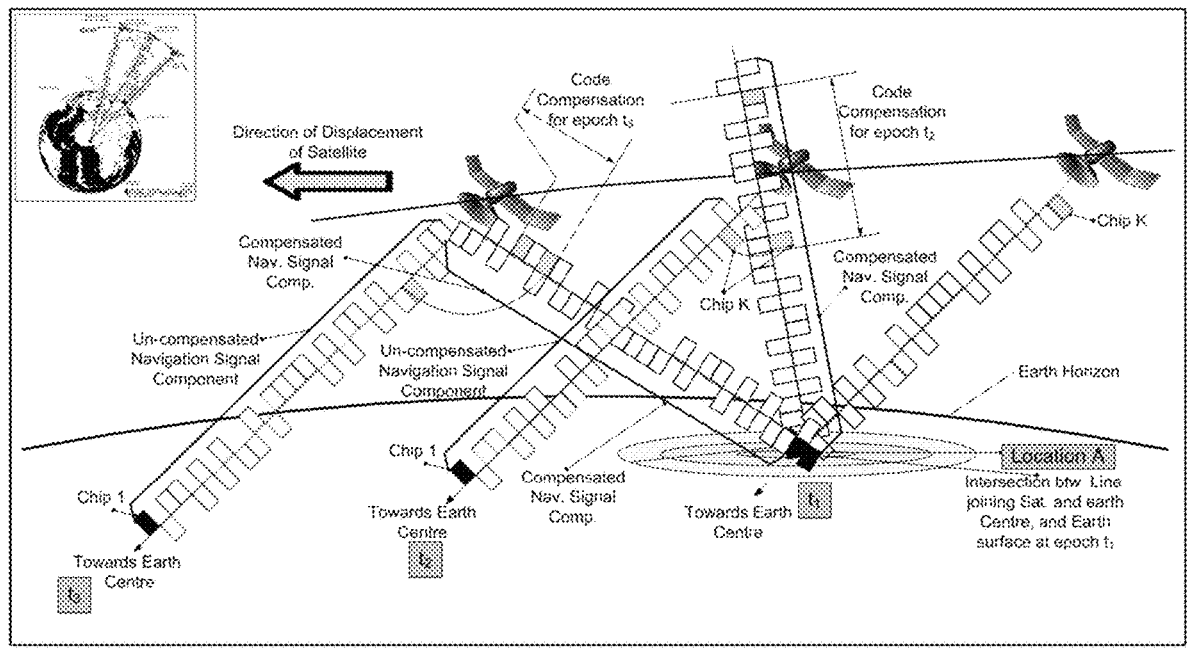
Figure 10:
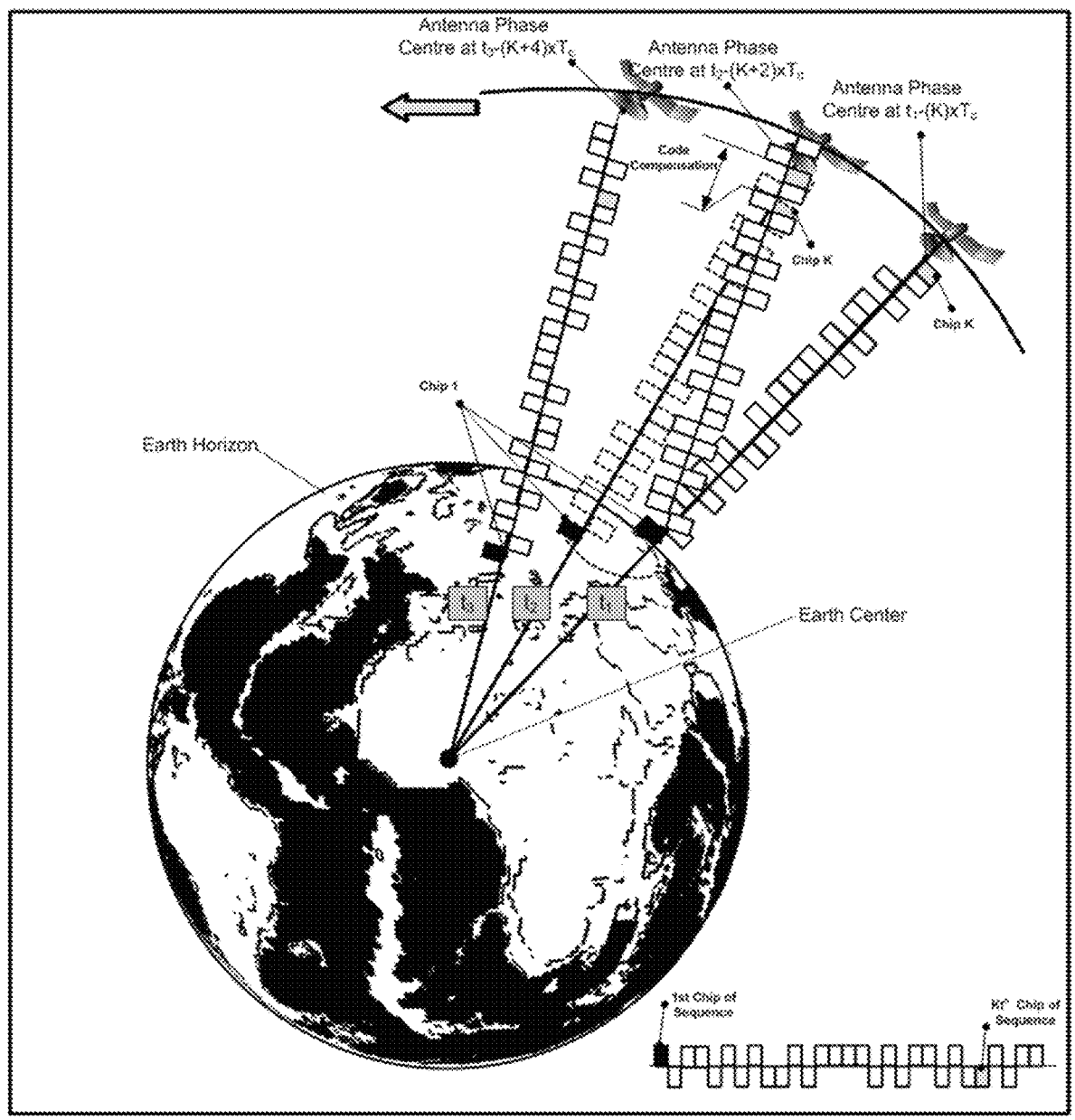
Figure 11:
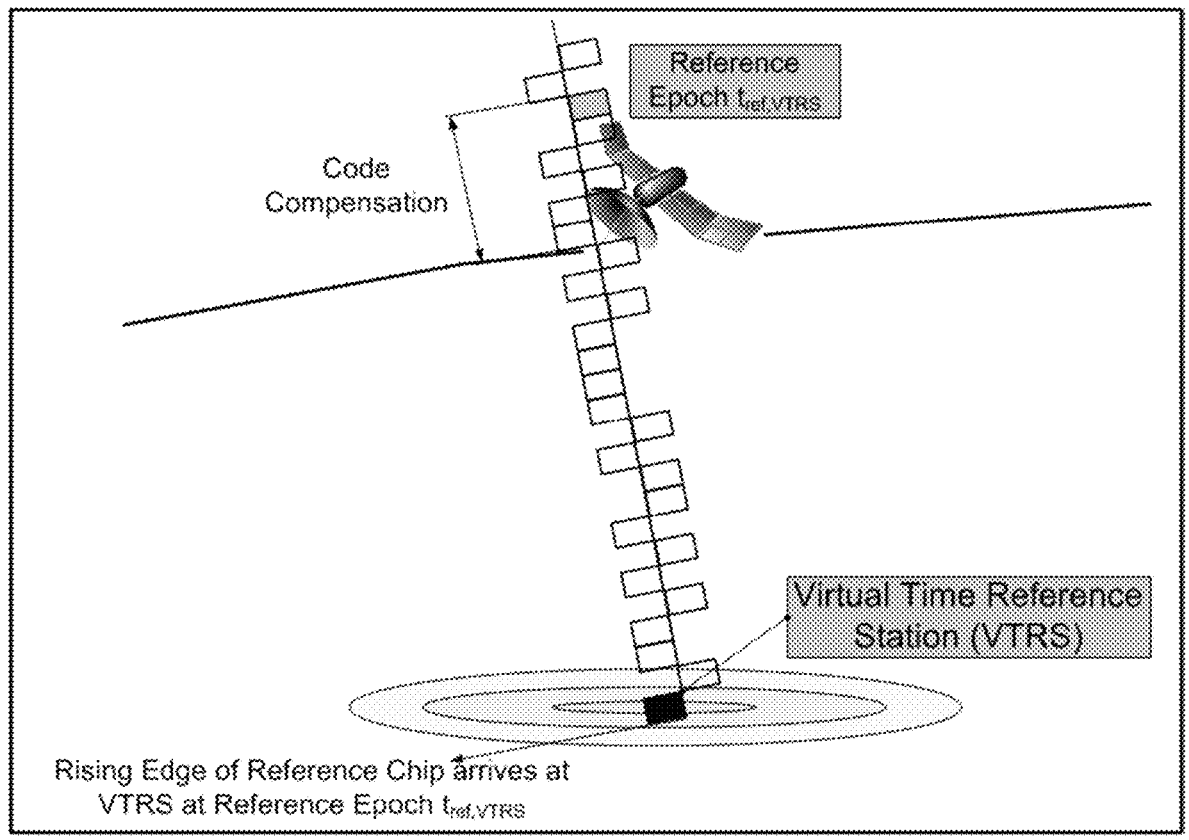
Figure 12:
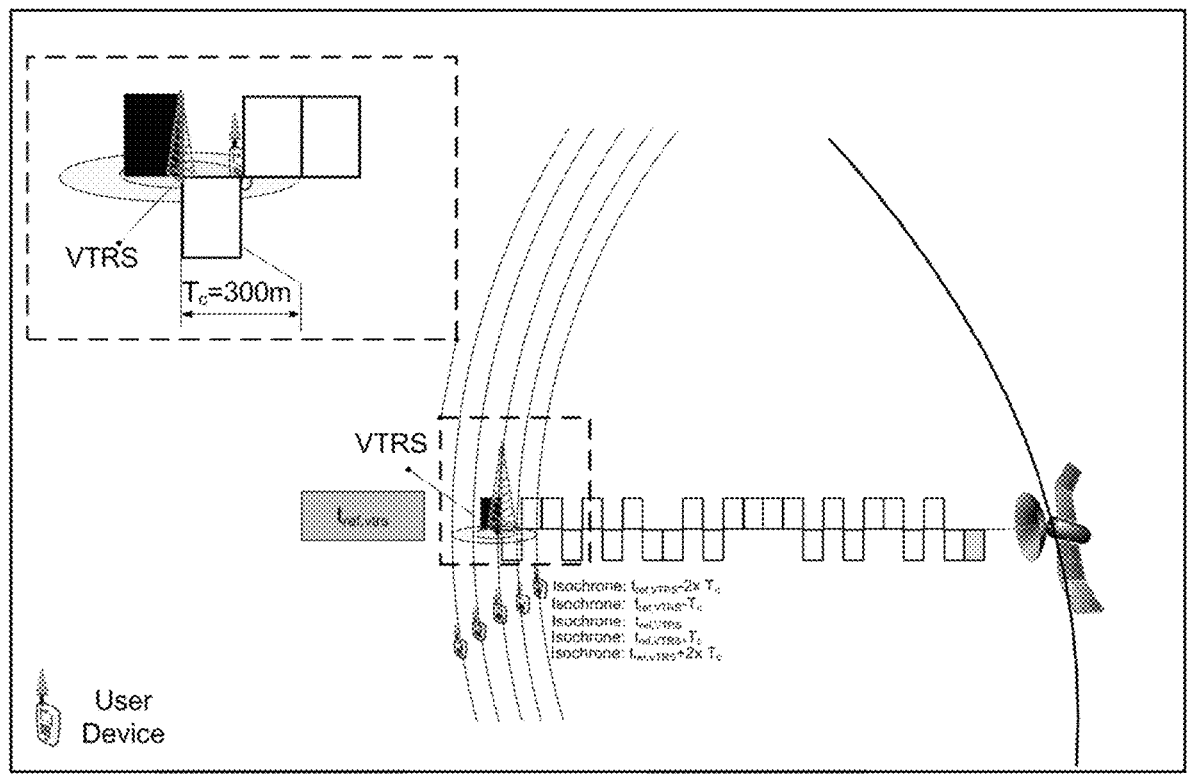
Figure 13:
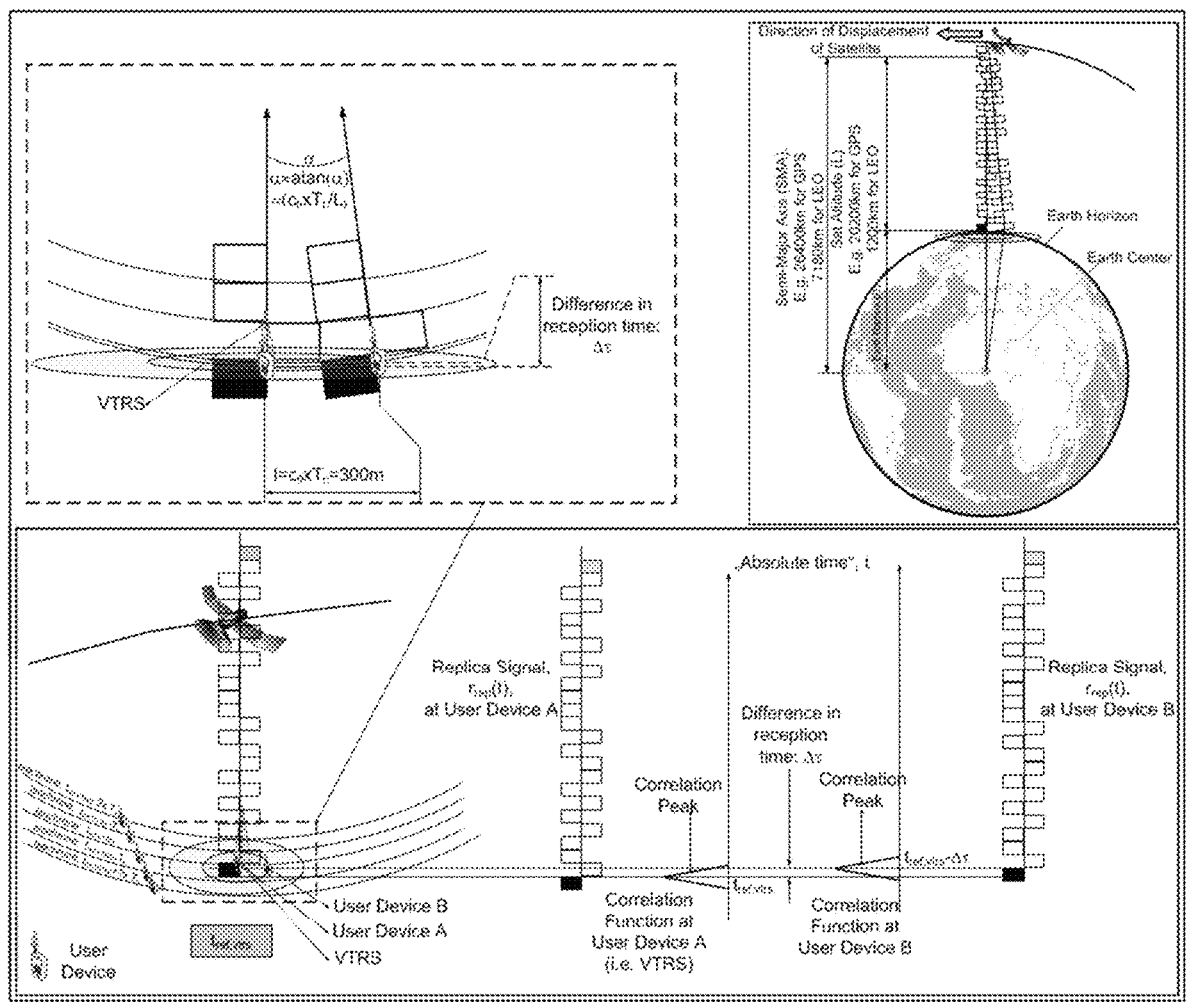
Figure 14:
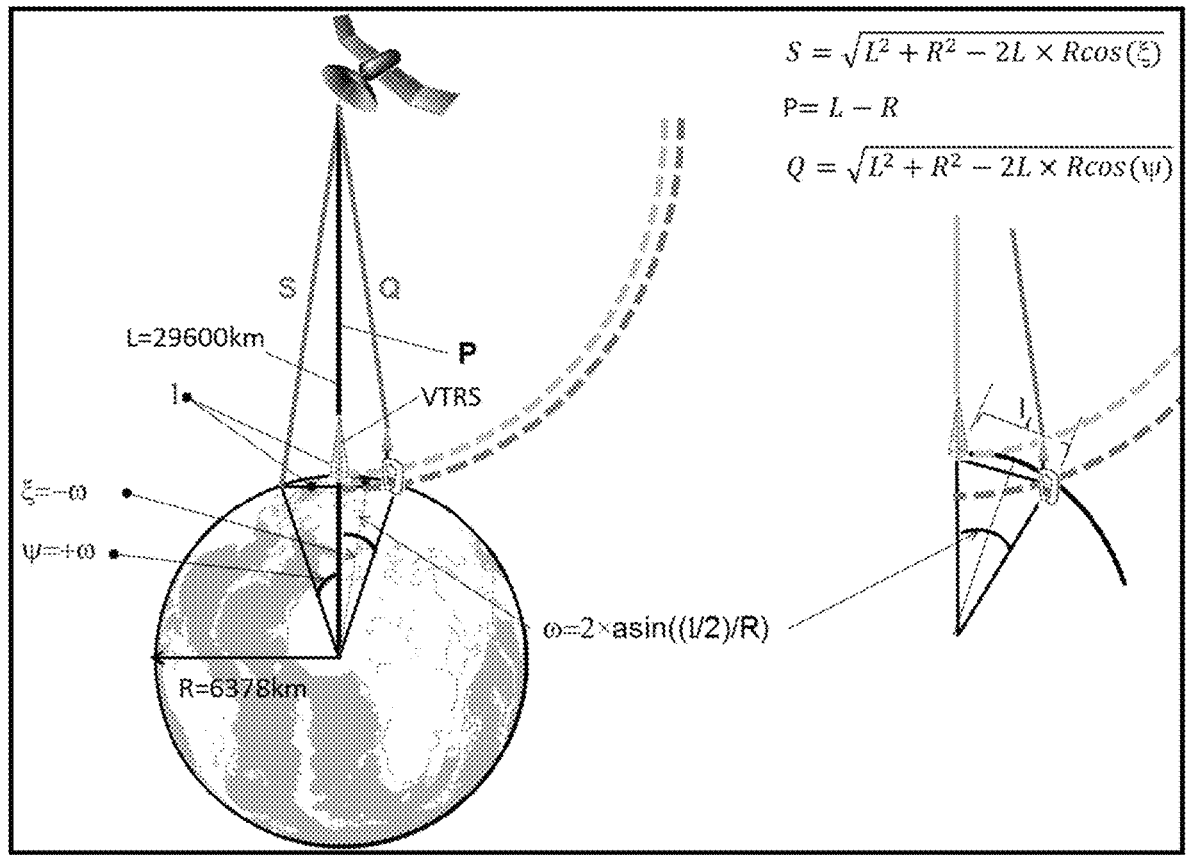
Figure 15:
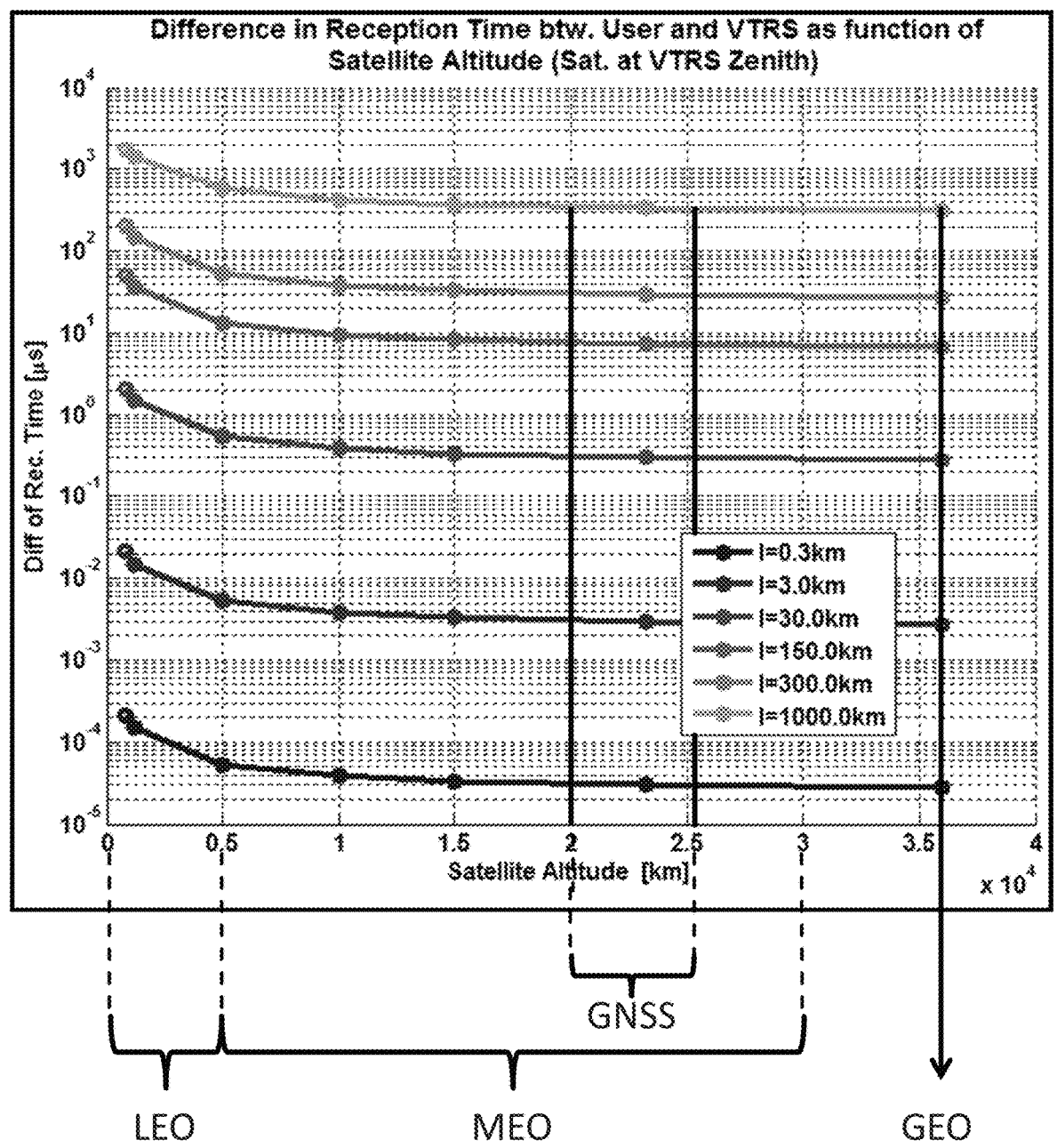
Figure 16:
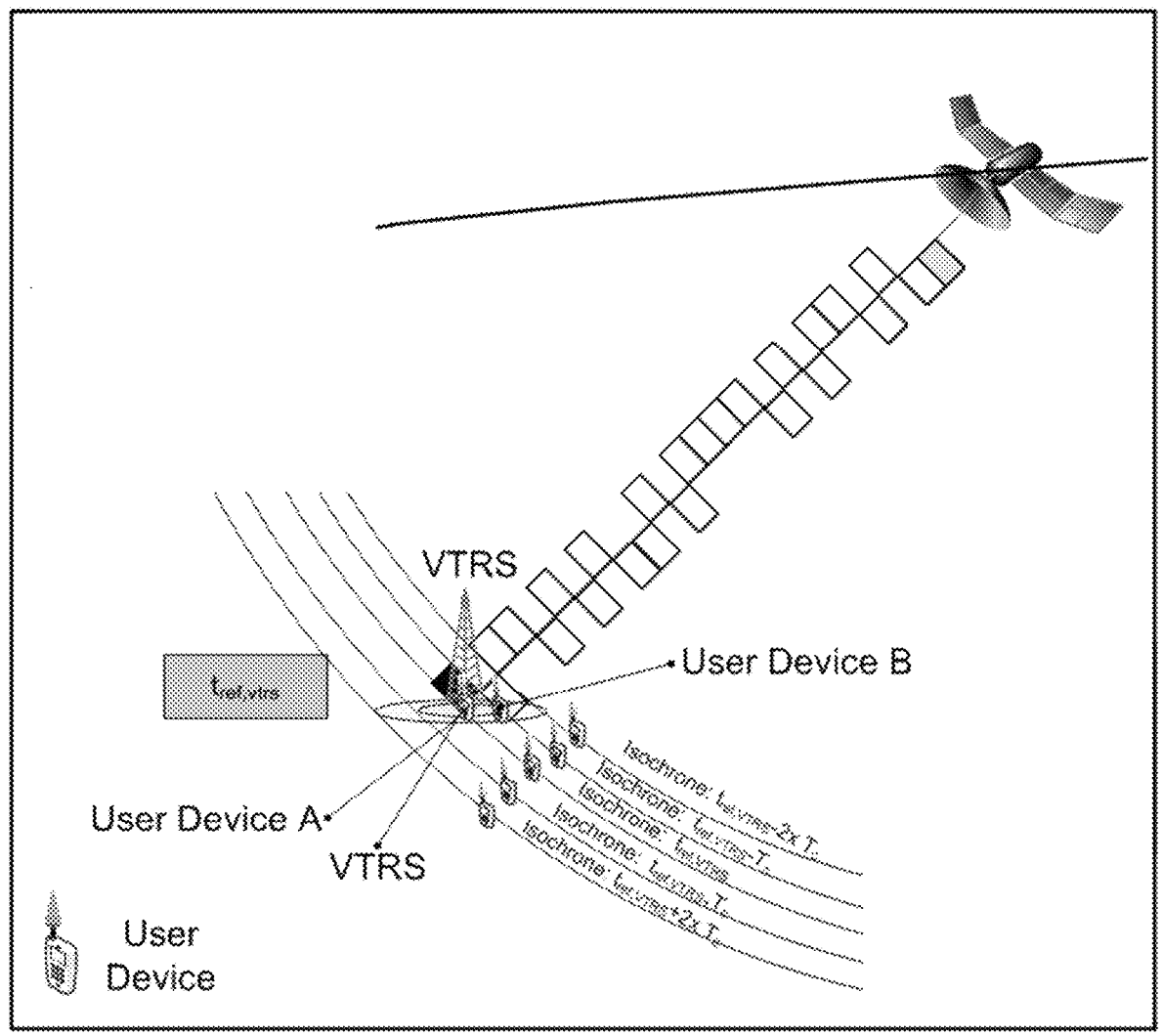
Figure 17:
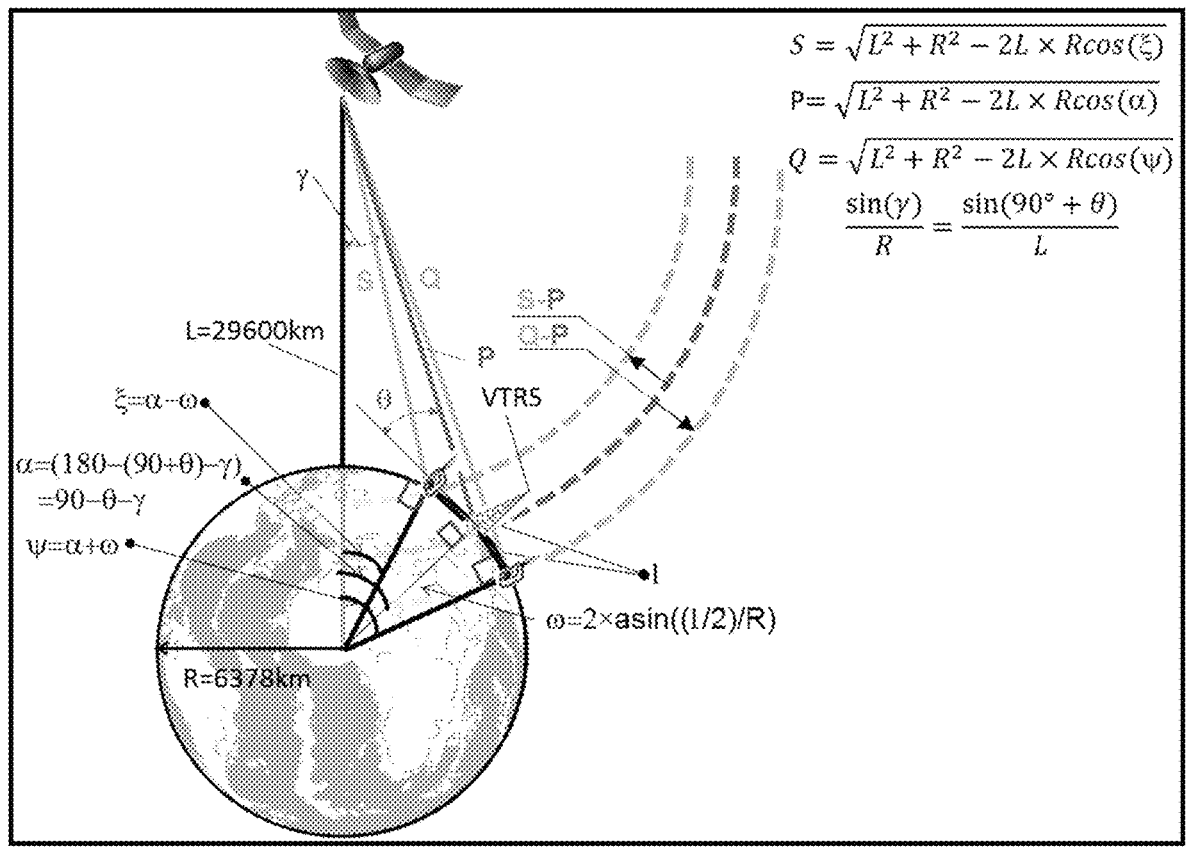
Figure 18:
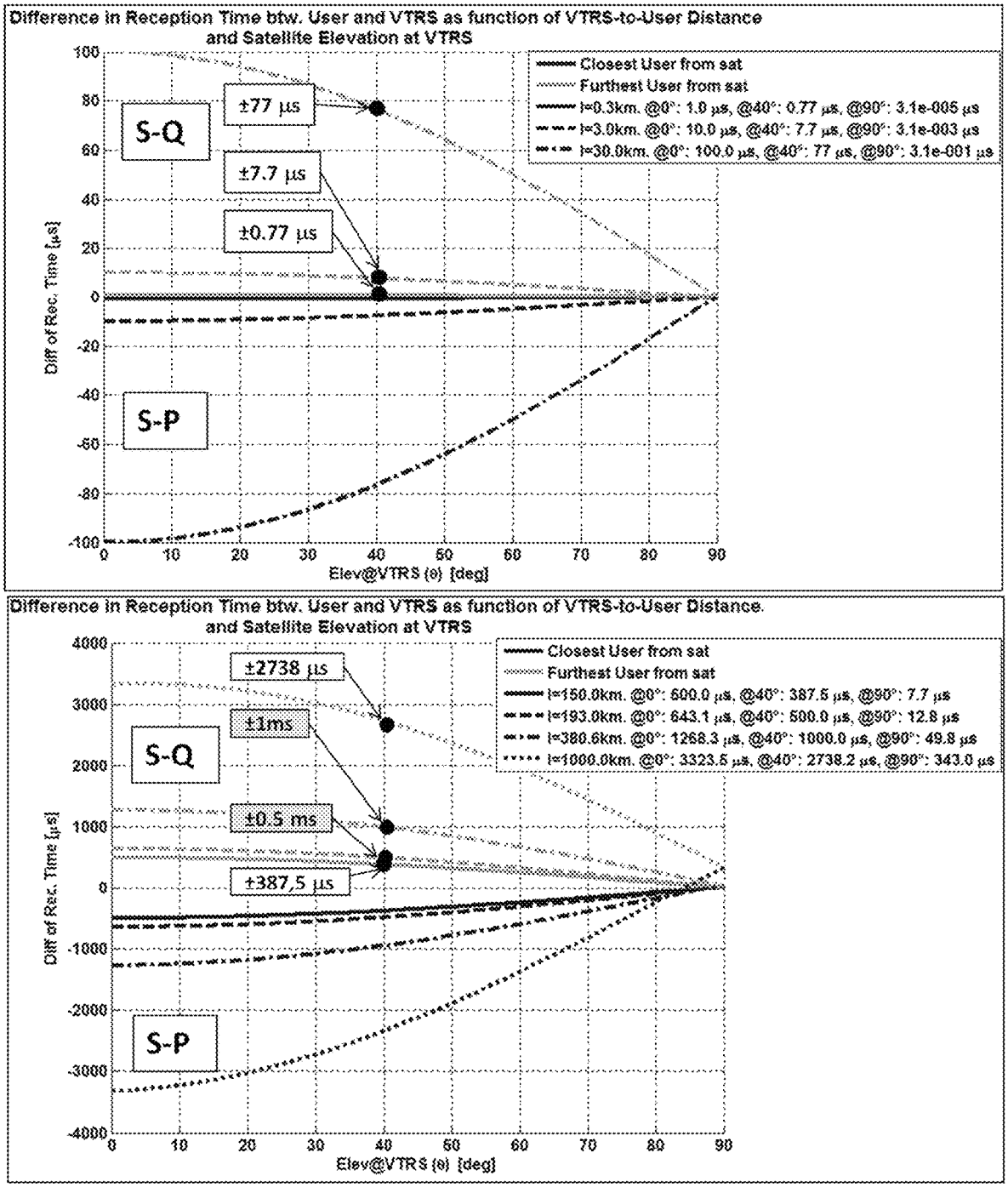
Figure 19:
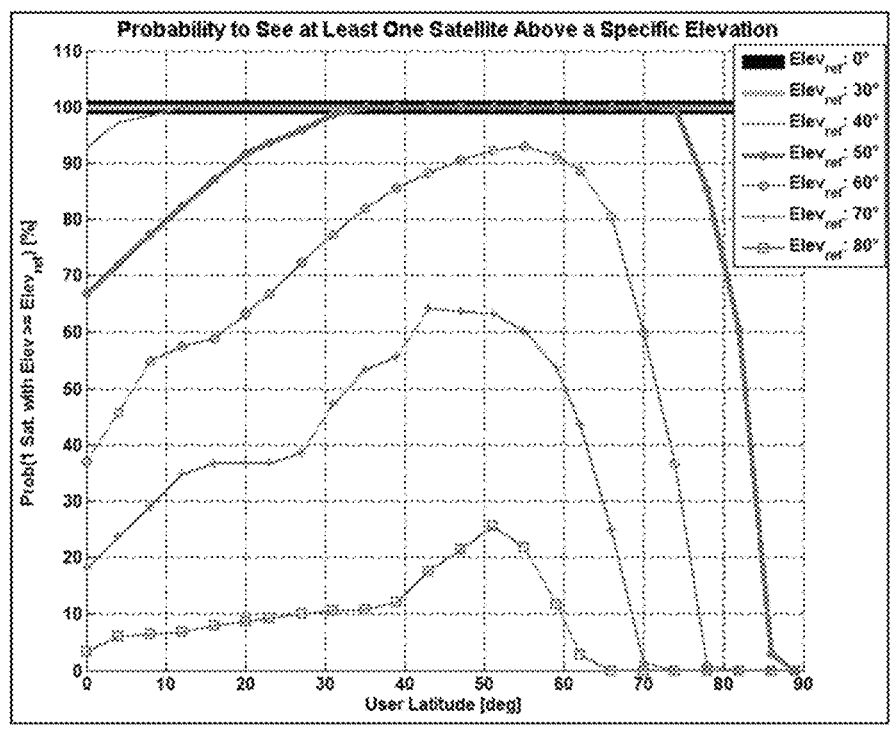
Figure 19:
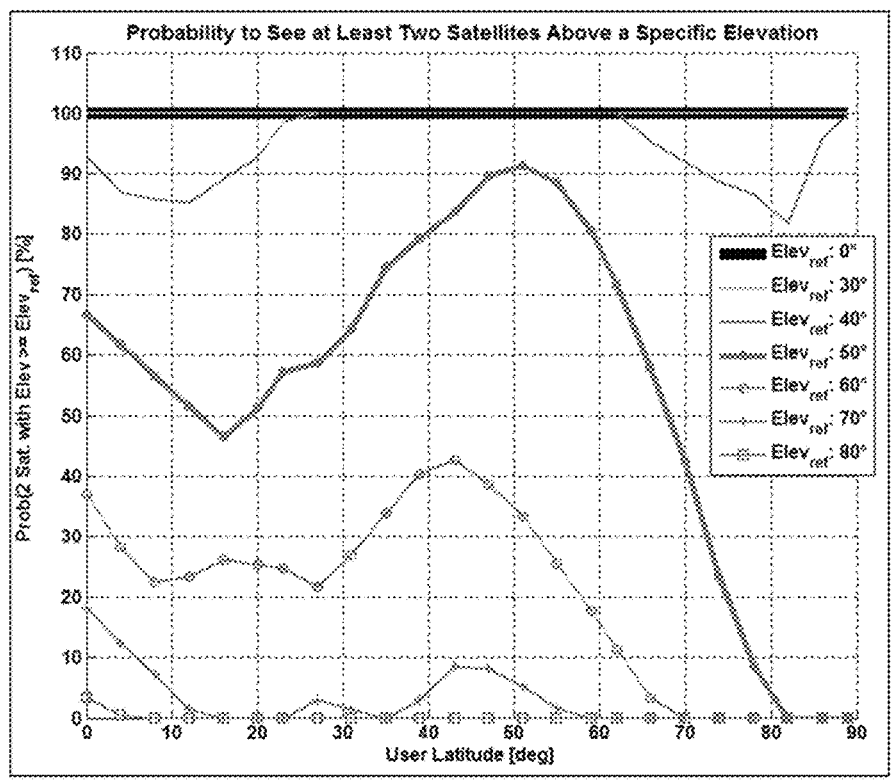
Figure 20:
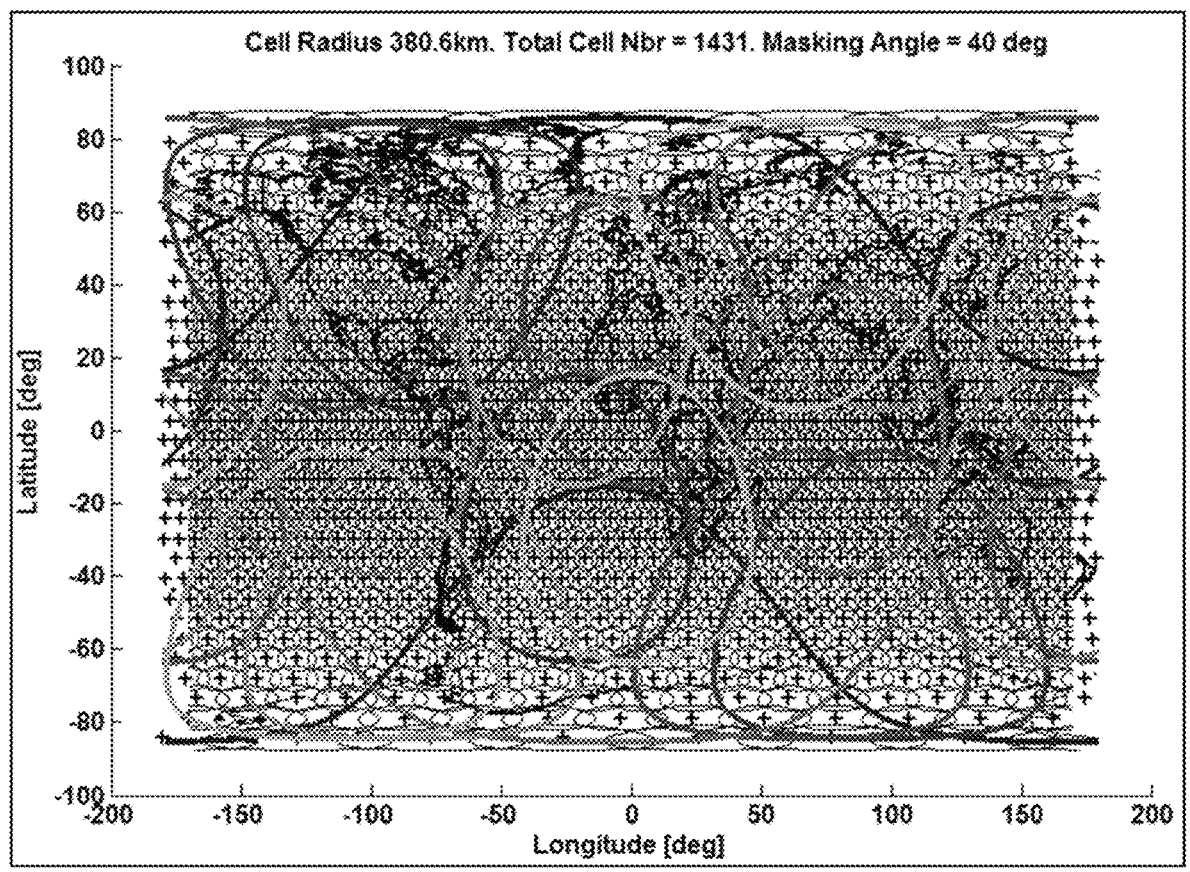
Figure 21:
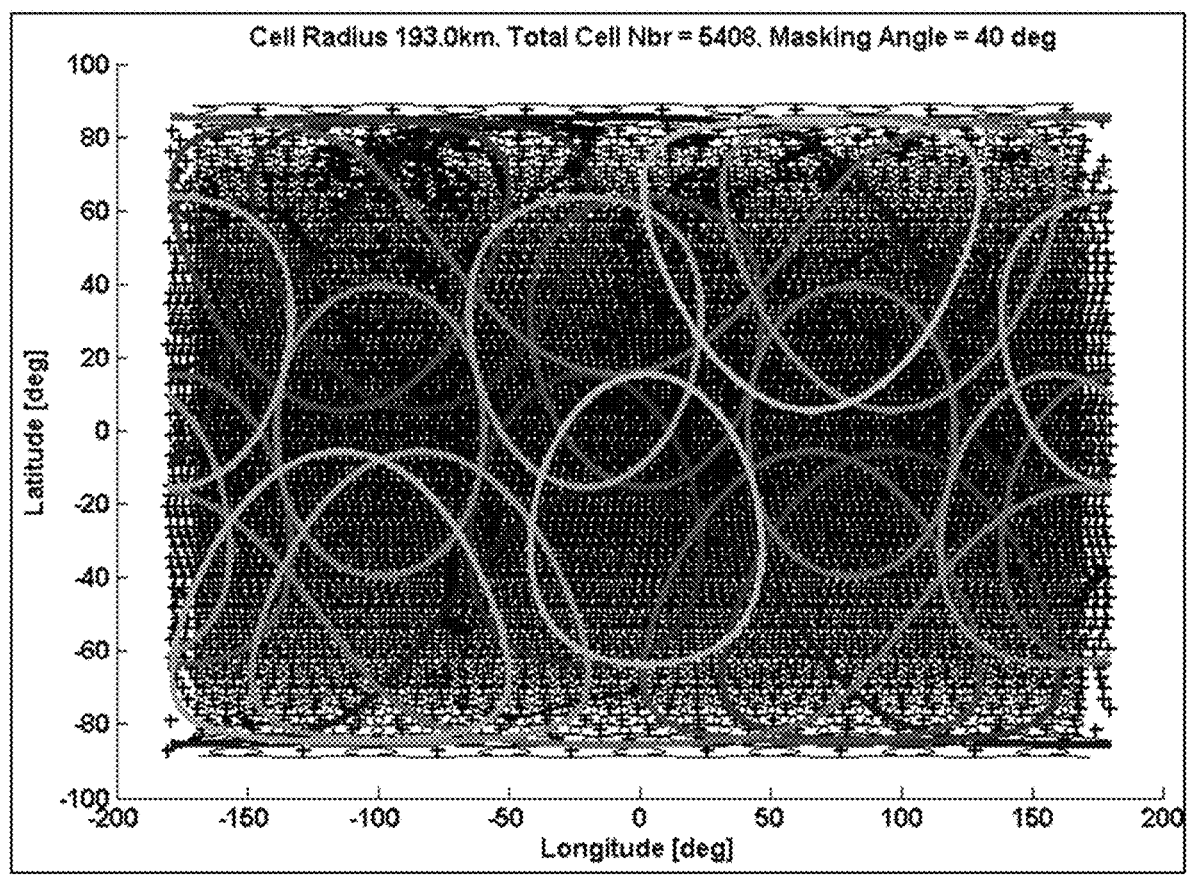
Figure 22:
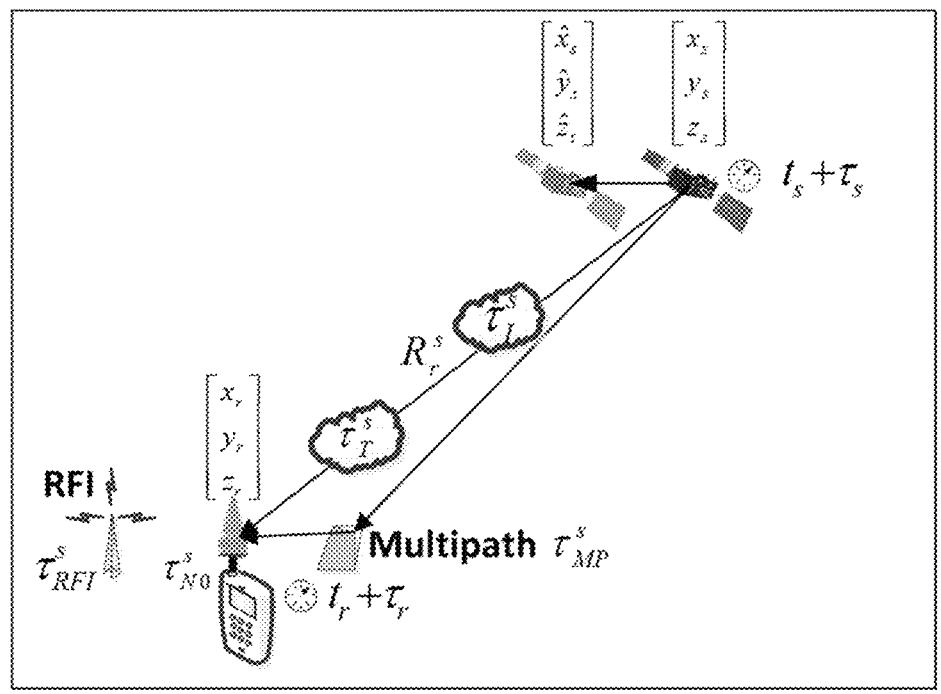
Figure 23:
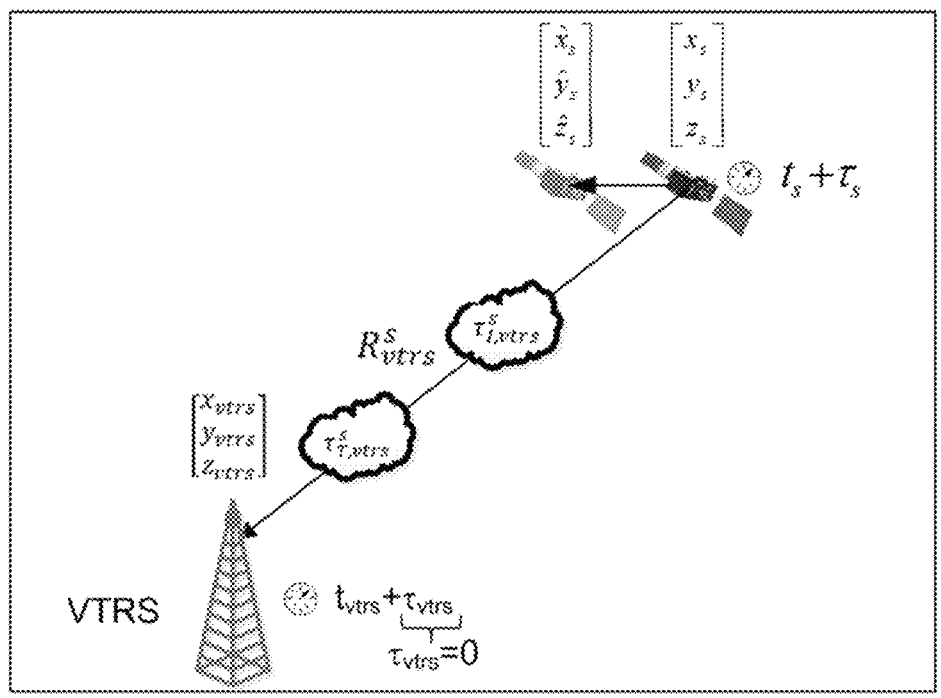
Figure 24:
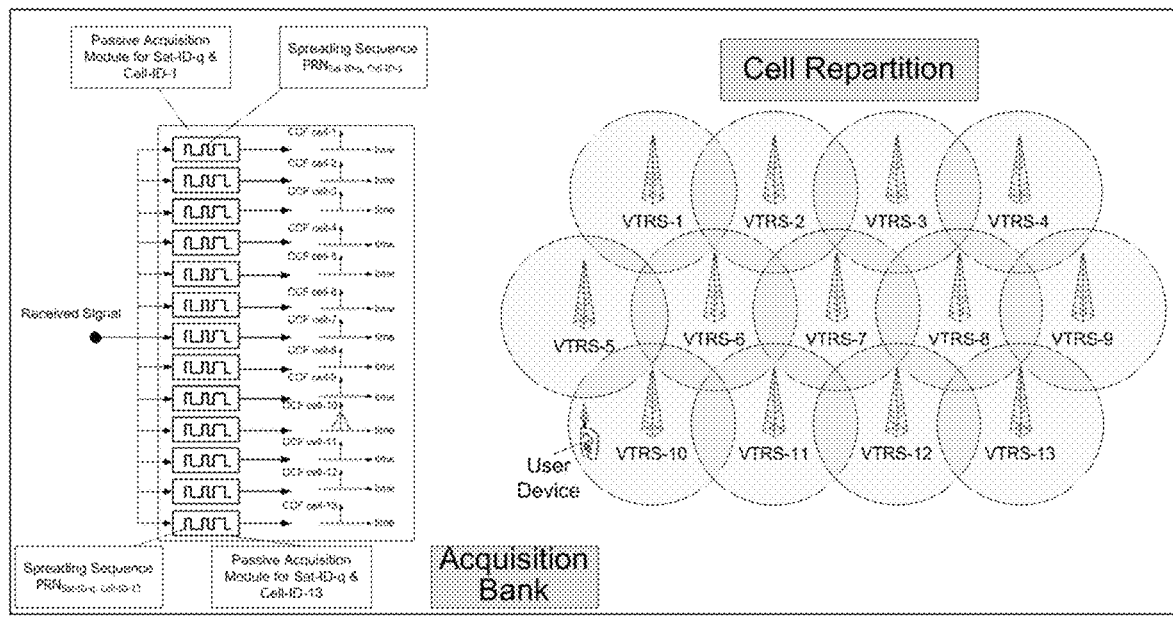
Figure 25:
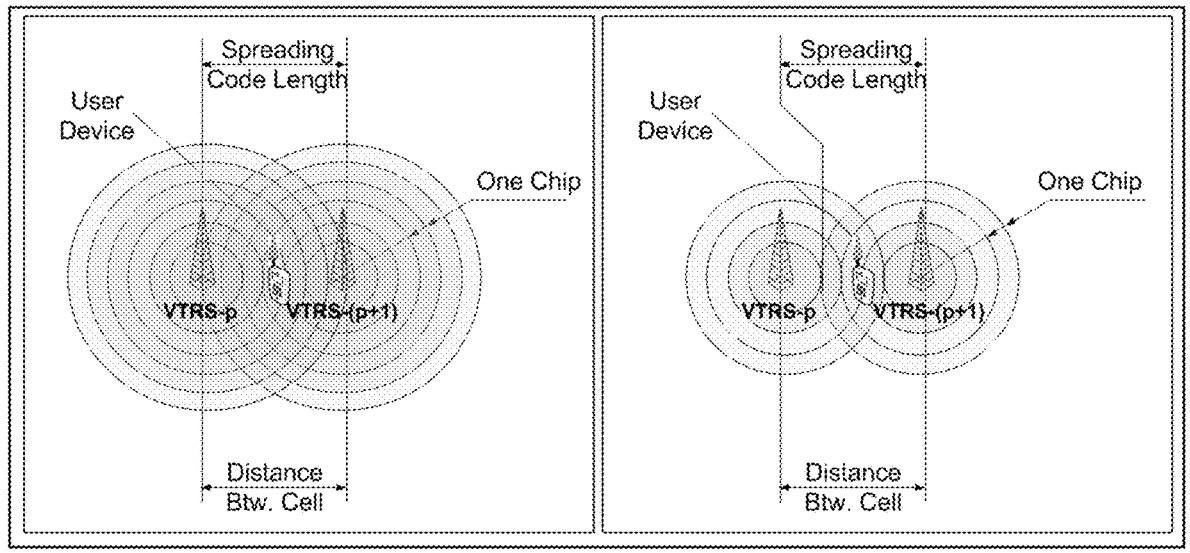
Figure 26:
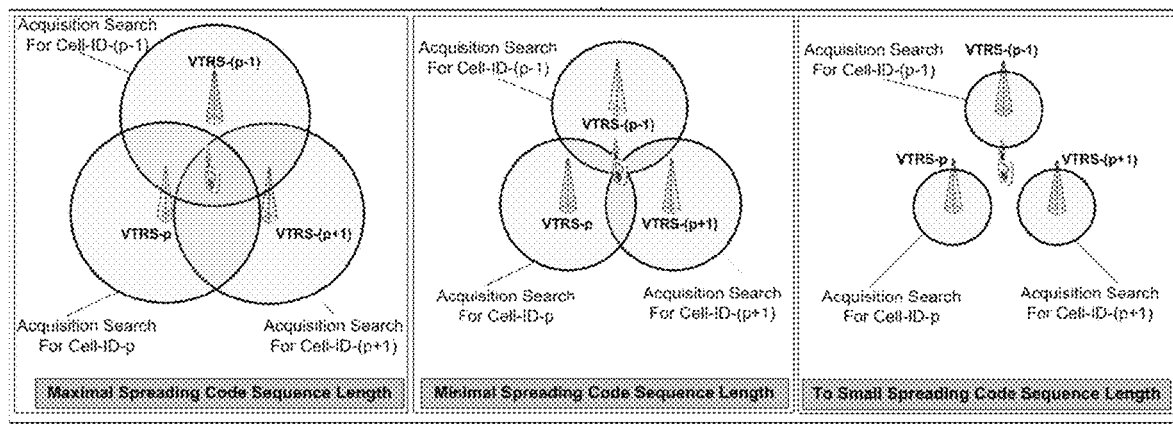
Figure 27:
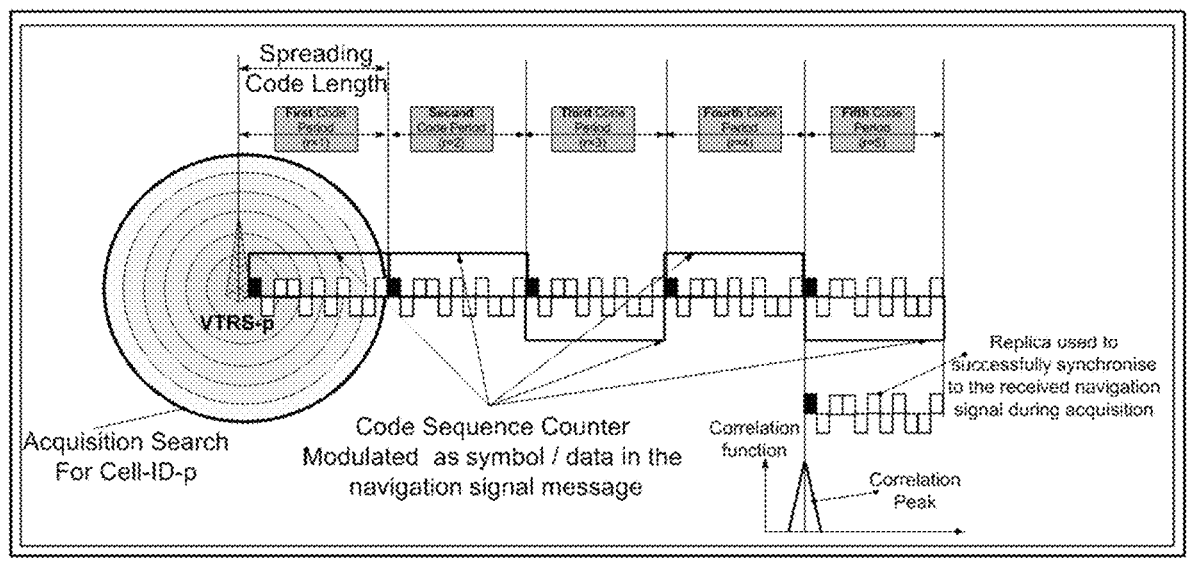
Figure 28:
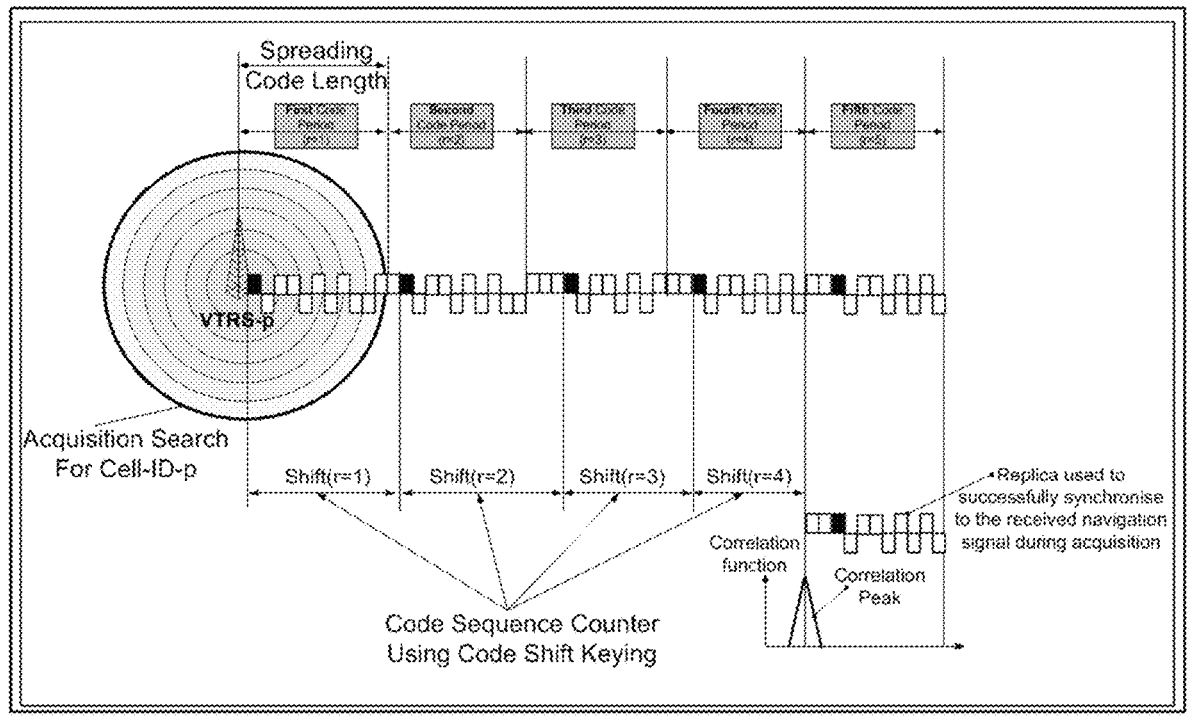
Figure 29:
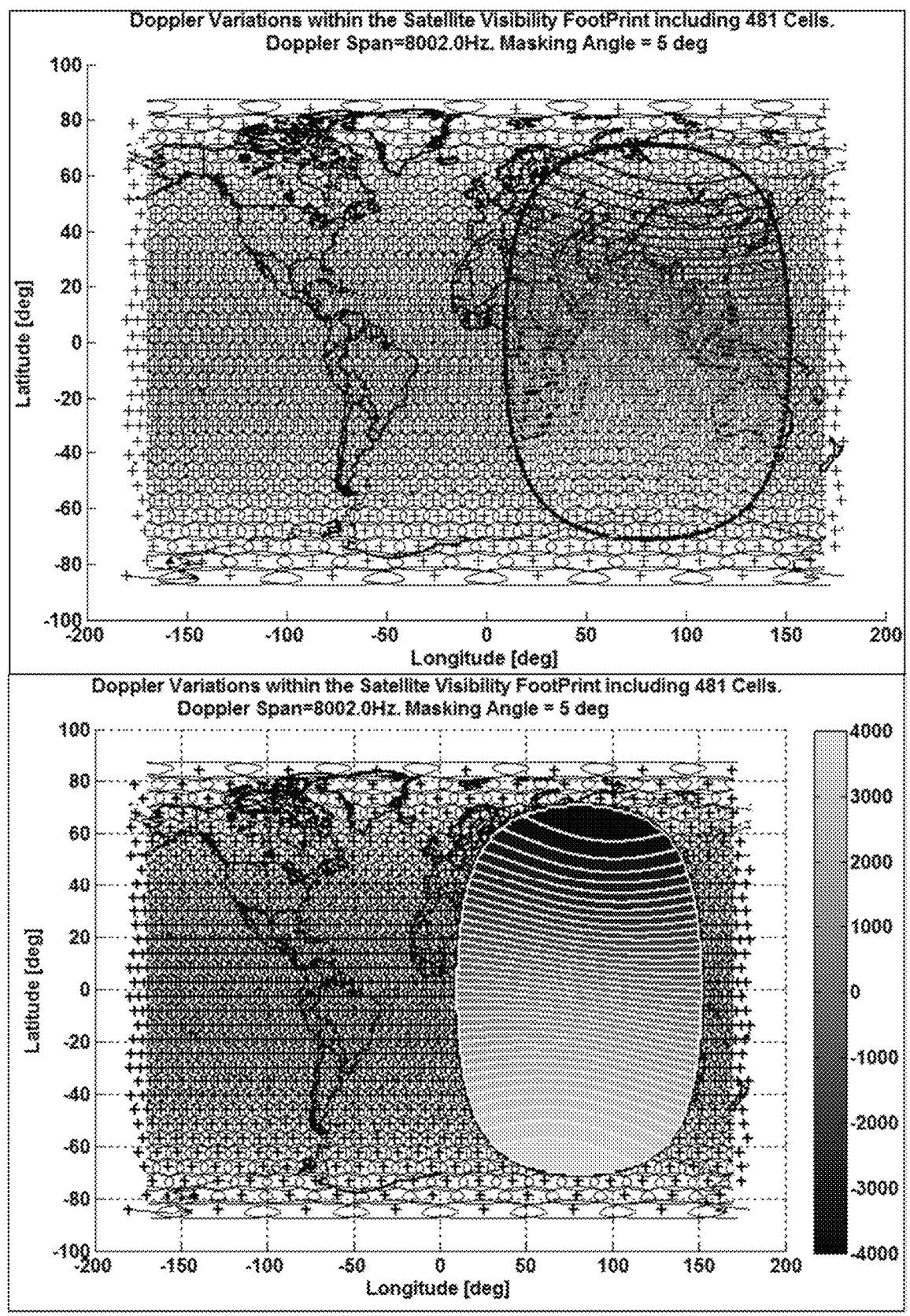
Figure 30:
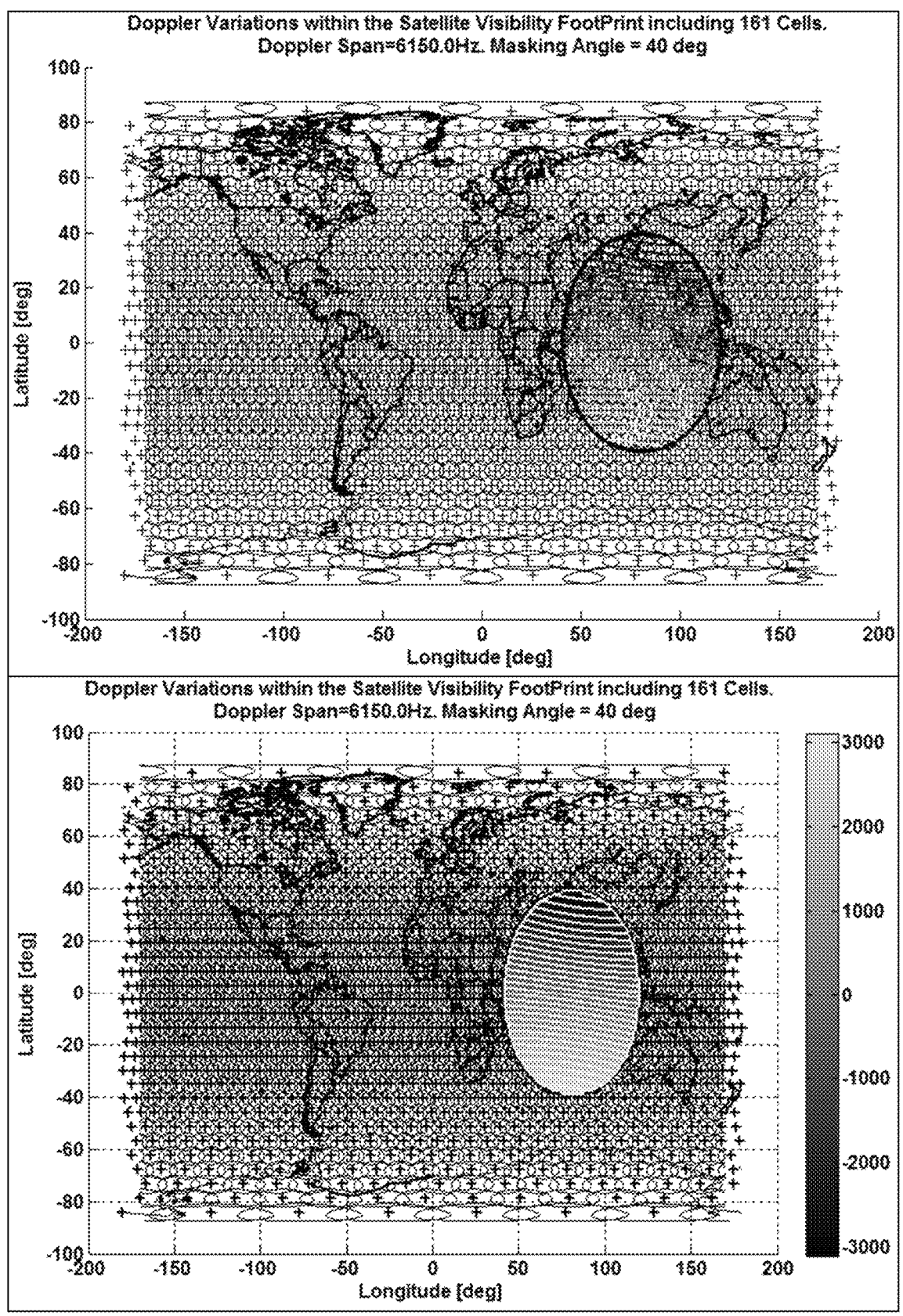
Figure 31:
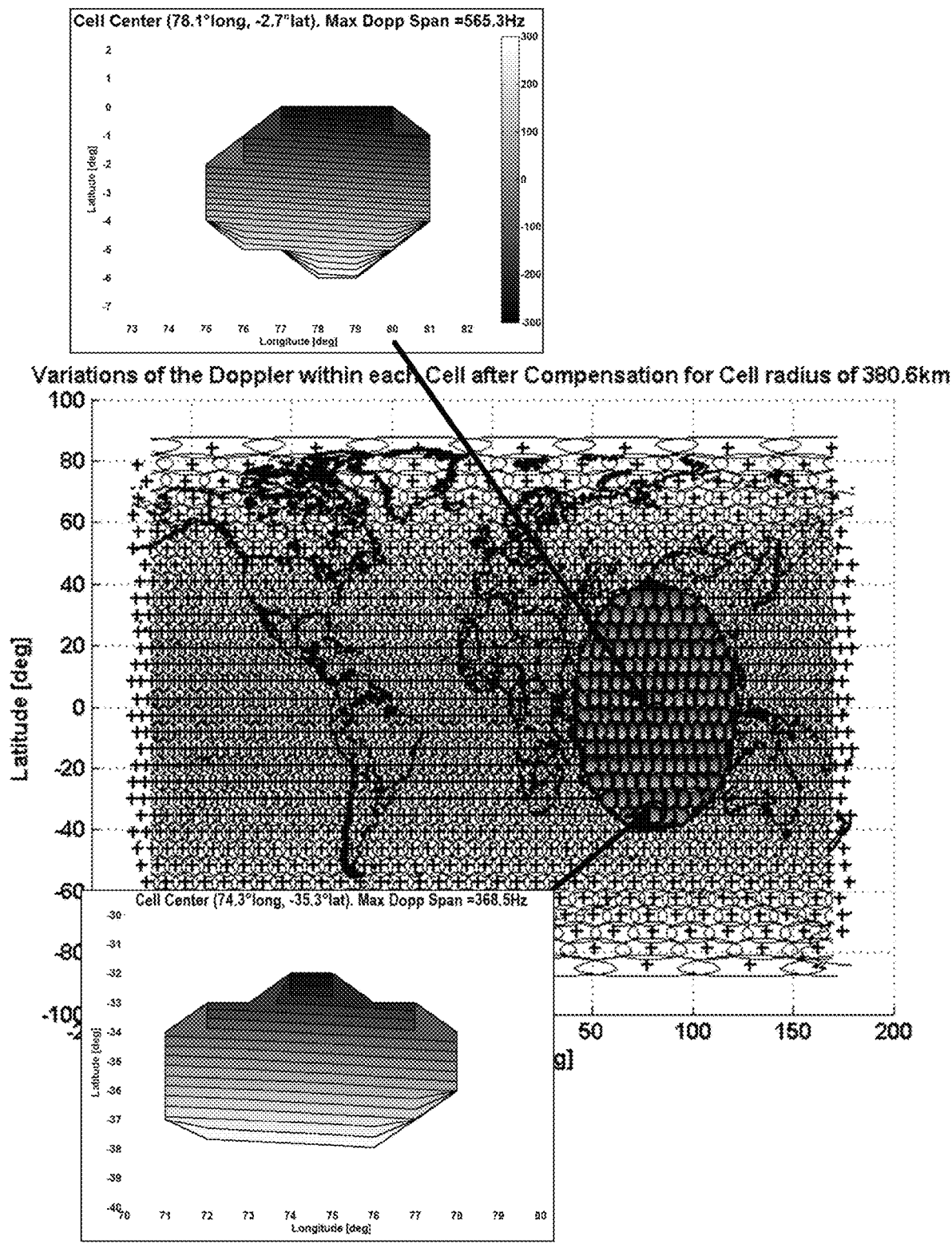
Figure 32:
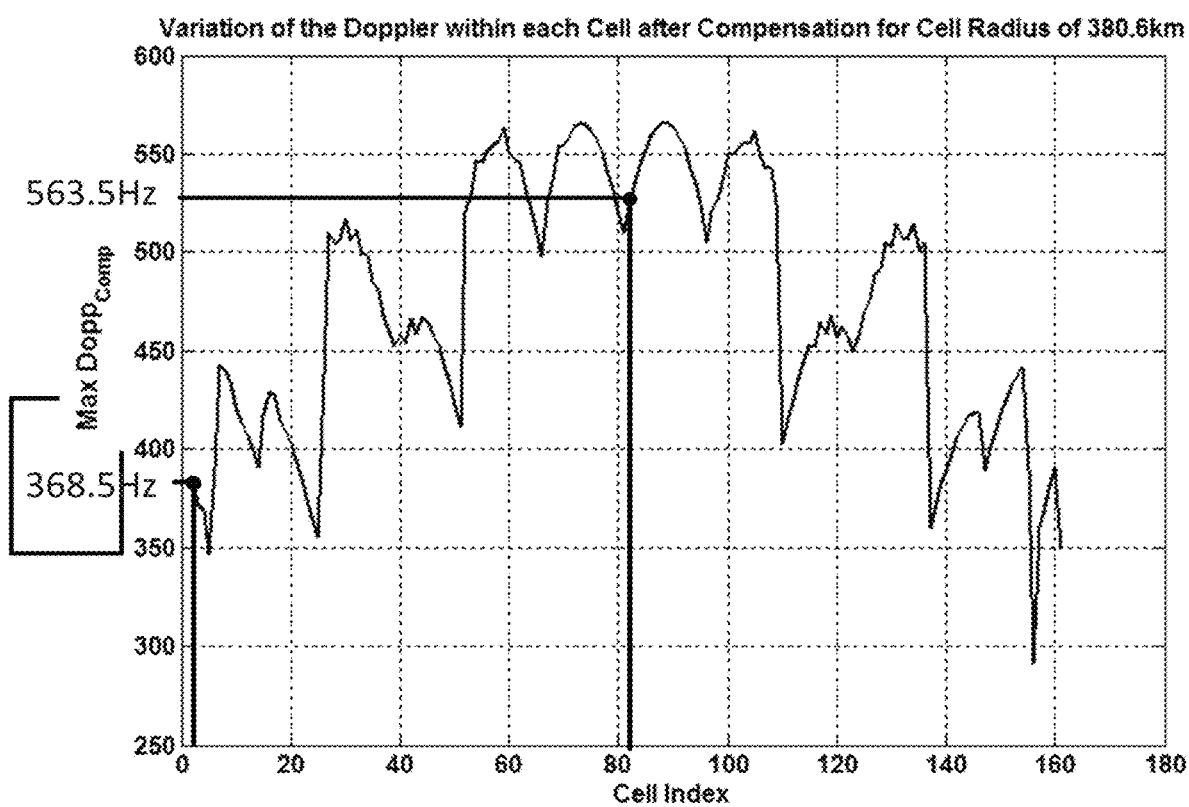
Figure 33:
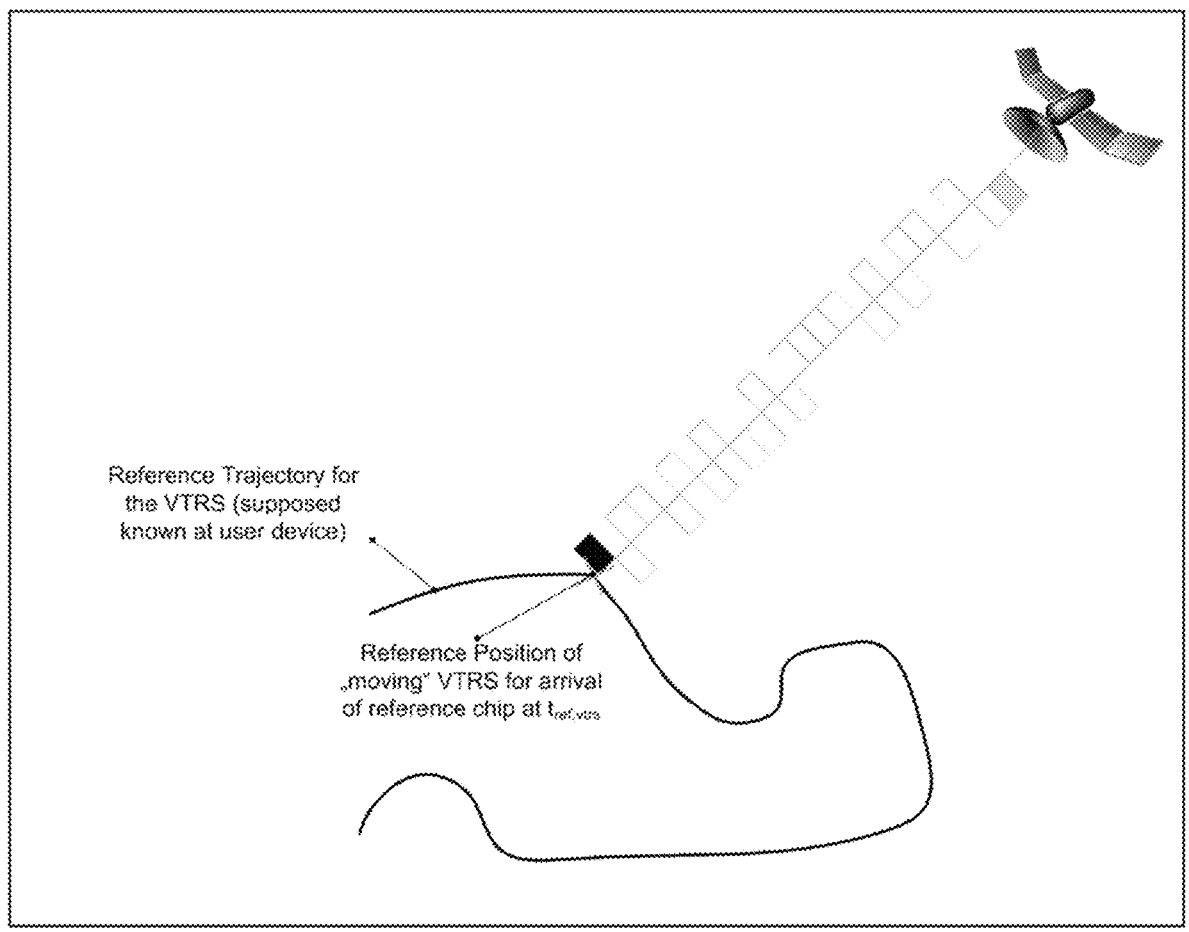
Figure 34:
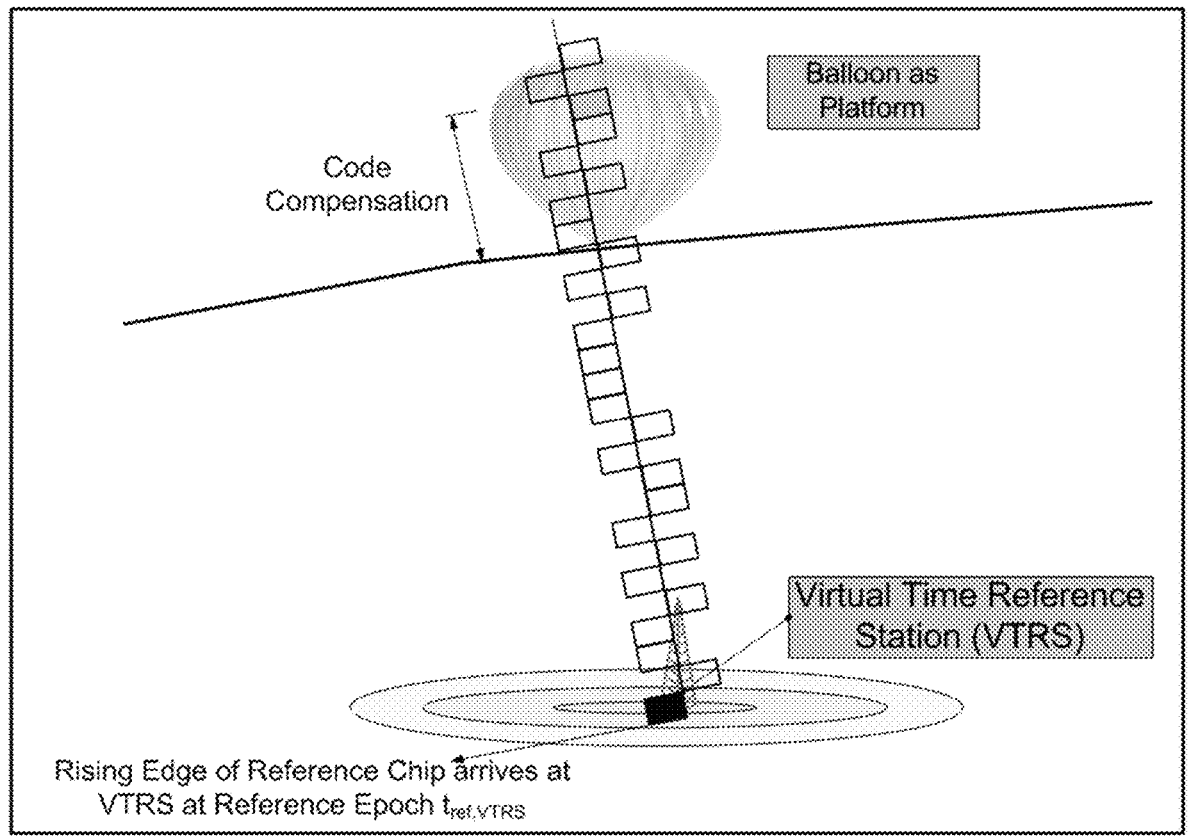
Figure 35:
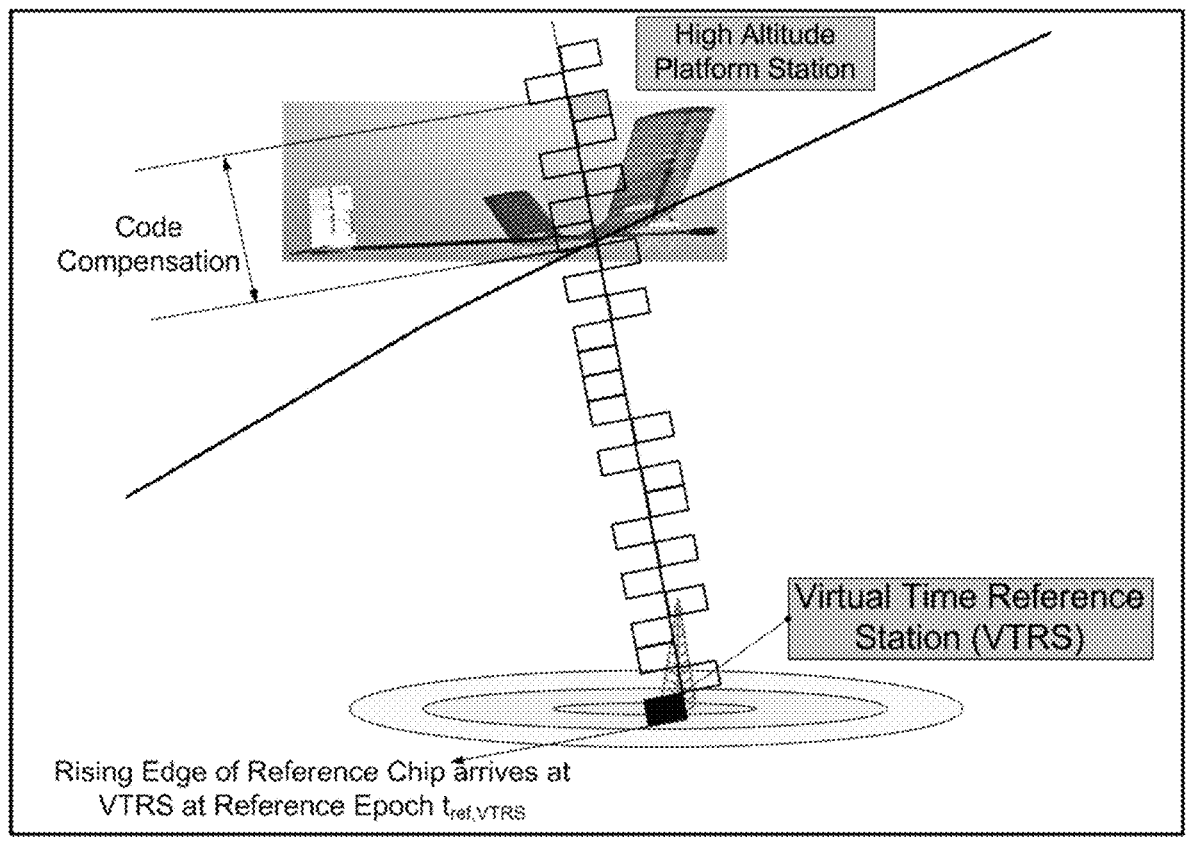
Figure 36:
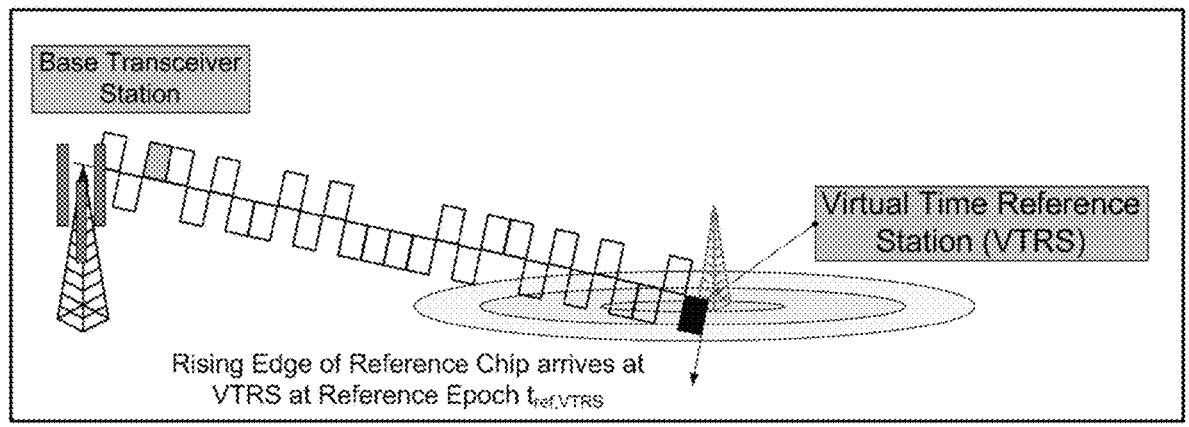
Figure 37:
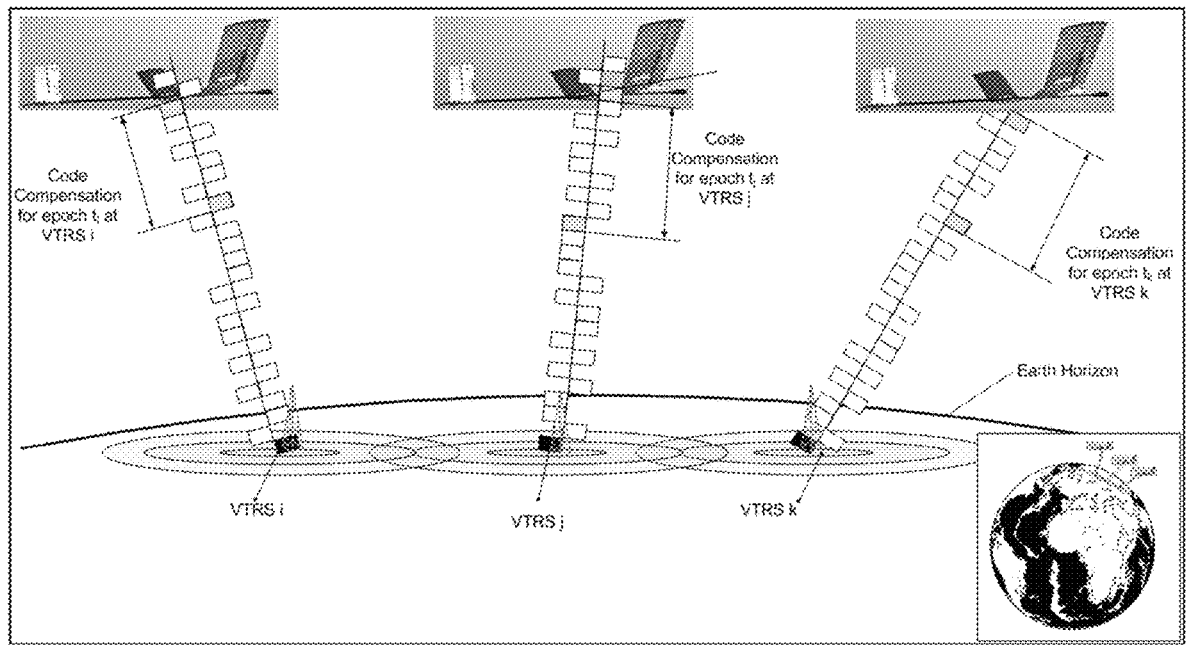

FIG. 1 schematically illustrates a typical GNSS signal generation chain implemented on-board a navigation satellite;

FIG. 2 schematically illustrates the generation of a simple navigation signal structure;

FIG. 3 schematically illustrates another evolution of the first navigation signal structure;

FIG. 4 schematically illustrates a further evolution of the first and second navigation signal structure;

FIG. 5 schematically illustrates the positions of one navigation satellite at different epochs;

FIG. 6 schematically illustrates propagation of different chips with respect to satellite antenna phase center;

FIG. 7 schematically illustrates propagation of different chips in all directions with respect to satellite antenna phase center;

FIG. 8 schematically illustrates propagation of different chips in all directions with respect to satellite antenna phase center;

FIG. 9 schematically illustrates a delayed transmission of the navigation signal component;

FIG. 10 schematically illustrates the principle of code compensation;

FIG. 11 schematically illustrates code compensation and an introduction of a Virtual Time Reference Station (cell);

FIG. 12 schematically illustrates Line of Sight between the VTRS and the satellite as tangent to the earth surface;

FIG. 13 schematically illustrates Line of Sight between the VTRS and the satellite as orthogonal to the earth surface;

FIG. 14 schematically illustrates parameters to be used in order to quantitatively determine the difference in reception time between a User Device A located exactly at VTRS and a User Device B located a distance 1 from the VTRS;

FIG. 15 schematically illustrates difference in reception time over satellite altitudes for different distances between the User Device B and the VTRS;

FIG. 16 schematically illustrates Line of Sight between the VTRS and the satellite as inclined to the earth surface;

FIG. 17 schematically illustrates parameters to be used in order to quantitatively determine the difference in reception time between a User Device A located exactly at VTRS and a User Device B located a distance 1 from the VTRS for a satellite being inclined with respect to the earth surface;

FIG. 18 schematically illustrates synchronization error as function of the elevation angle, considering the distance between the User Device and the VTRS;

FIG. 19 schematically illustrates probability to see at least one satellite above a specific elevation over user latitude, and probability to see at least two satellites above a specific elevation over user latitude;

FIG. 20 schematically illustrates a sectorization of the earth;

FIG. 21 schematically illustrates a sectorization of the earth with a smaller cell radius;

FIG. 22 schematically illustrates geometrical positions of a satellite transmitting a positioning signal and a user equipment;

FIG. 23 schematically illustrates time propagation between satellite and a VTRS;

FIG. 24 schematically illustrates passive acquisition modules forming a dense mesh over the earth surface;

FIG. 25 schematically illustrates a duration of Spreading Code sequence equal (left part) and smaller (right part) than an inter-cell distance;

FIG. 26 schematically illustrates three situations for a maximal spreading code sequence length (left), an optimal spreading code sequence length (middle) and a non-sufficient spreading code sequence length (right);

FIG. 27 schematically illustrates a first implementation of a code sequence counter;

FIG. 28 schematically illustrates a second implementation of a code sequence counter;

FIG. 29 schematically illustrates geographical variations of the actual received Doppler (minimal elevation angle of 5°);

FIG. 30 schematically illustrates geographical variations of the actual received Doppler (minimal elevation angle of 40°);

FIG. 31 schematically illustrates Doppler variations within each cell;

FIG. 32 schematically illustrates a maximal Doppler variation after compensation;

FIG. 33 schematically illustrates a moving VTRS with a reference trajectory known by the user device;

FIG. 34 schematically illustrates a balloon as platform for implementing compensation techniques;

FIG. 35 schematically illustrates a High Altitude Platform Station as platform for implementing compensation techniques;

FIG. 36 schematically illustrates a terrestrial station as platform for implementing compensation techniques; and FIG. 37 schematically illustrates an application of the code compensation when applied to HAPS.

DETAILED DESCRIPTION OF THE PREFERRED EMBODIMENTS

The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It is understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It is further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The platform, the compensation technique(s), the system and the user device will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

The present disclosure may often refer to Global Navigation Satellite System (GNSS) whose Space Segment comprises Medium Earth Orbit (MEO) satellites, and may in particular use illustrations based on MEO satellites. This is to ease the comprehension of the underlying concept. However, the present disclosure is not restricted to this type of MEO platform, but can also be applied to other types of space-based platforms, such as Low Earth Orbit (LEO) or Geostationary Earth Orbit (GEO) satellites or any alternative near-earth platforms such as High Altitude Platform Stations (HAPS), a Balloon or Drones. The present disclosure can even be proposed for terrestrial "static" platforms such as Base Transceiver Stations (BTS) used in general for terrestrial mobile network infrastructures, or such as terrestrial Navigation Beacons, also called Pseudo-satellites or Pseudolites.

FIG. 1 schematically illustrates a typical GNSS signal generation chain implemented on-board a navigation satellite. The GNSS signal generation chain of FIG. 1 comprises an on-board Frequency and Time Generation Unit (FTGU), encompassing one or more highly stable clocks (typically Atomic clocks) and responsible to provide to the other elements of the chain (also called payload units) a very stable timing or frequency source.

The GNSS signal generation chain of FIG. 1 further comprises an on-board Navigation Signal Generation Unit (NSGU), responsible to generate the navigation signal transmitted by the satellite. The signal generation unit from the description above may be referred herein as the NSGU. The satellite can transmit one or more navigation signals simultaneously. Thus, the NSGU is capable of generating those navigation signals, also called signal components. For example, the satellites of the GPS system generates and transmits the GPS-C/A, L1C signals in the frequency band [1559-1591 MHz] with a reference carrier frequency of $f_{carrier}$=1575.742 MHz, while the Galileo system generates and transmits the E1-B and -C components in the same frequency band. In the following the NSGU is especially responsible to generate the corresponding signal components at Baseband, to up-convert them to the RF frequency (e.g. 1575.742 MHz), and to multiplex them. The physical implementation of the aforementioned functionalities (BB generation, Up-Conversion and multiplexing) is specific to each navigation system/satellite and can be performed in independent or combined units, and the analogue to digital interface (with a Digital-to-Analogue Converter, DAC) can also take place at different places of the signal generation chain. Nevertheless, the aforementioned functionalities can all be encountered in a generic Navigation Signal Generation Unit.

The GNSS signal generation chain of FIG. 1 further comprises a navigation antenna responsible to radiate the generated navigation signal components towards the earth. The antenna phase center may be the geometrical reference point for the navigation signal transmission. The transmitting unit from the description above may be part of the NSGU and the navigation antenna or may be the navigation antenna.

The generic signal generation chain for a GNSS satellite can be employed on-board LEO, HAPS, or Drones. The main difference may be the dimension of the antenna, and possibly the range for the transmit power of the corresponding navigation signals. This generic signal generation chain can also be used in Base Transceiver Stations (BTS) or in pseudolites.

In GNSS, the structure of each Navigation Signal Component, at baseband, comprises a spreading sequence, composed of N elementary binary symbols also called chips. Each spreading sequence can, but does not have to be modulated with symbols. In absence of symbol modulation, i.e. when the spreading sequence is not modulated, the corresponding symbol-less signal component is called Pilot component. The symbols can but do not have to be mapped into binary data, by applying a so-called coding technique such as convolutive coding or LDPC (which are the most encountered types of coding in navigation signals). Coding techniques are especially suited to improve coding performances. The spreading sequence can itself be composed of a first layer of spreading code, called primary code, or alternatively it can be obtained by combining a primary code layer and a second layer of secondary codes, where each primary code sequence is modulated with one chip of the secondary code sequence. Further, the pulse waveform of each chip of the primary sequence can take the form of a simple Binary Phase Shift Keying (BPSK) waveform, or a more complex waveform such as a Binary-offset-Carrier (BOC), or another type of waveform not explicitly described.

The former description provides main characteristics and constituents of the most encountered navigation signals. In FIGS. 2 to 4, three typical signal structures of navigation signals are shown.

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g. FIGS. 2-37).

FIG. 2 schematically illustrates the generation of a simple navigation signal structure, composed of a binary sequence comprising N chips, and which is modulated with a symbol. The chip rate $f_c$ equals $N \times f_0$, where $f_0$ equals 1,023 MCps, and the symbol rate equals $f_s = f_c/N$. The chip duration $T_c$ is equal to the inverse of the chip rate $T_c = 1/f_c$. FIG. 2 represents $N_s$ different symbol epochs. The coding process used to generate symbol on the basis of binary data with data rate $f_d$ is also represented in FIG. 2. The Coding Rate (CR) represents the ratio between the data and symbol rate (the Coding Rate is for example ½ for the typical convolutive coding rate applied by GPS or Galileo data signal components). In absence of coding, one binary data is represented by one binary symbol directly. In absence of symbol modulation, the navigation signal structure at baseband is just the repetition of primary codes, concatenated one after the other, yielding a Pilot or data-less component. The functional blocks for the Primary Code Generation, and the Symbol Data generation are both fed with the clock signal generated by the FTGU.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g. FIG. 1) or below (e.g. FIGS. 3-37).

FIG. 3 schematically illustrates (a second navigation signal structure) another evolution of the first navigation signal structure, since it includes the aforementioned two layers of the spreading sequence. The primary code comprising N chips is modulated with symbols of the secondary sequence comprising $N_{sc}$ secondary codes. In that case, the data rate $f_d$ equals the chip rate (of the primary sequence) divided by ($N \times N_{sc}$) and multiplied with the Coding Rate, CR. [000100] More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g. FIGS. 1-2) or below (e.g. FIGS. 4-37).

FIG. 4 schematically illustrates a further evolution of the first and second navigation signal structure, since it includes the application of a pulse waveform for the chip of the binary sequence (i.e. primary sequence). For illustration, a BOC(1,1) pulse waveform is applied. In that case each binary chip of duration $T_c$ is replaced by two plateaus of duration $T_c/2$ each, one with amplitude of +1 and a second one with amplitude −1 (this is also represented on the bottom of FIG. 3).

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g. FIGS. 1-3) or below (e.g. FIGS. 5-37).

The generation and transmission of the GNSS signals is typically performed continuously over the time and path of the GNSS satellite, meaning that the stream of navigation signals as "concatenation of spreading sequences modulated with symbol" is leaving continuously the phase center of the navigation antenna. This is illustrated in FIG. 5 which depicts at different epochs $t_1$, $t_2$ and $t_3$ the positions of one navigation satellite for a displacement direction from right to left, as well as the propagation of two specific chips, with index 1 and K, of a spreading sequence of one navigation signal component. For this illustrative example, K represents the last chip of the spreading sequence comprising 1023 chips with duration $T_c$=1 μs. K can also be any of the chips of spreading sequence. The chip of index 1, highlighted with a black colored cell, represents the first chip of the spreading sequence of the corresponding navigation signal component, which is used later as "reference chip". The $K^{th}=1023^{rd}$ chip is highlighted with a grey colored cell. In FIG. 5, the direction of the signal propagation from the satellite (at each epoch) towards the earth center is also indicated. When the epochs $t_1$, $t_2$ and $t_3$ are close (differences expressed in seconds), then the corresponding directions of signal propagation may be almost collinear. However, due to the small radius of the circular orbit relative to the earth radius (in this exemplary illustration), the corresponding direction are however not "parallel". This is only a consequence of the dimensions used for this exemplary illustration. Furthermore, the position of the first chip is illustrated in FIG. 5, for the epochs $t_1$, $t_2$ and $t_3$. It means that the actual satellite position when the $K^{th}$ chip is transmitted may have changed with respect to the satellite position when the first chip was transmitted 1023 chips (or equivalently 1 ms) earlier with a distance depending on the along-track velocity of the satellite. For example, a GPS satellite with a Semi-Major Axis (SMA) of 26400 km, the along-track velocity is given by:

$$v = \sqrt{\frac{GM}{SMA}} = \sqrt{\frac{3.986E14}{29600E3}} = 3.7 \text{ km/s}$$

Assuming a chip rate of $f_c$=1 MCps, or equivalently a chip duration of $T_c$=1 μs, the satellite may have moved by 3.9 mm during the transmission of one chip. For 1023 chips (which corresponds to transmission between the $1^{st}$ and $1023^{rd}$ chip), or 1 ms, the aforementioned distance becomes 3.9 m. Similarly for a LEO satellite at an altitude of 800 km (SMA of 7180 km), the LEO satellite may have moved by 7.45 mm during the transmission of one chip, and 7.45 m during transmission of a spreading sequence of 1023 chips. For sake of simplification, the satellite is assumed at the same position when transmitting the $K^{th}=1023^{rd}$ chip. Furthermore, the Sagnac effects due to the earth rotation are not accounted for this simplification.

Further, during epoch $t_1$ and $t_2$ two additional chips (K+1 and K+2) may have been sent from the satellite. Similarly, between $t_2$ and $t_3$, two additional chips (K+3 and K+4) may have been sent from the satellite. The exact number of additional chips transmitted between epochs depends thus on the satellite orbit (velocity, altitude) and on the interval duration between epochs ($t_1$ and $t_2$) or ($t_2$ and $t_3$), which are expressed in seconds in this assumption.

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g. FIGS. 1-4) or below (e.g. FIGS. 6-37).

FIG. 6 schematically illustrates propagation of different chips with respect to satellite antenna phase center. This further representation is a close-in of FIG. 5. In addition to FIG. 5, the intersection between the line joining the Satellite and the Earth Centre and the earth surface itself at each epoch is also represented, together with circles around this intersection point. For this example the rising edge of the chip 1 arrives at the intersection between the line joining the Satellite and the Earth Centre and the earth surface at the first epoch, which is denoted "Location A", for epoch $t_1$.

More details and aspects are mentioned in connection with the embodiments described above or below. The embodiment shown in FIG. 6 may comprise one or more optional additional features corresponding to one or more aspects mentioned in connection with the proposed concept or one or more embodiments described above (e.g. FIGS. 1-5) or below (e.g. FIGS. 7-37).

FIG. 7 and FIG. 8 (Close-In) schematically illustrate in complement to FIG. 5 and FIG. 6 the propagation of the different chips in all directions with respect to satellite antenna phase center. Such propagations are symbolized with arcs in dashed lines since the propagation in the medium is considered isotropic. Those arcs are centered at the antenna phase center, with a radius equal to the distance between the antenna phase center and the rising edge of the chip at the given epoch. One specific direction of interest is the direction between the phase center of the antenna and the Location A. For the assumed geometry, the number of chips that have passed the "Location A" at epoch $t_2$ or at epoch $t_3$ depend on geometrical parameters such as the satellite orbit (e.g. altitude), the chip rate, but also the distance between location A and the satellite at those specific epochs $t_2$ or $t_3$. This is due to the reception of the first chip of the spreading sequence at epoch $t_1$. In FIG. 8, 11 chips may have been passed at epoch $t_2$ at location A, since the reception of the first chip at epoch $t_1$.

More details and aspects are mentioned in connection with the embodiments described above or below. The embodiments shown in FIGS. 7 and 8 may comprise one or more optional additional features corresponding to one or more aspects mentioned in connection with the proposed concept or one or more embodiments described above (e.g. FIGS. 1-6) or below (e.g. FIGS. 9-37).

In one or more aspects, the transmission of the navigation signal component and especially the underlying chip stream may be disciplined in such a way that the latter arrives at a specific location and at a specific time epoch. This is illustrated in FIG. 9. FIG. 9 schematically illustrates a delayed transmission of the navigation signal component. The transmission of the navigation signal component may be "delayed" in such a way that the rising edge of the first chip of the navigation signal component arrives at the "Location A" at a given reference time. In order to achieve this, a so-called "code compensation" may be applied to the navigation signal generation unit before epoch $t_2$. The corresponding "code compensation" is also represented in FIG. 9. The code compensation may be understood as the distance between the "chip K" of the un-compensated spreading sequence (grey cell) projected onto the direction between satellite position and Location A at the reference epoch, and "chip K" of the compensated spreading sequence. The corresponding code compensation has the same value as the number of chips that have passed the "Location A" at epoch $t_2$, since reception of the first chip at epoch $t_1$, also represented in FIG. 8. A similar code compensation may also be represented at the "Location A" at epoch $t_3$ (instead of $t_2$), as shown in FIG. 9 in order to guarantee that the rising edge of the first chip of the navigation signal component arrives.

FIG. 9 represents the compensation that shall be applied to ensure reception of the rising edge of the chip 1 at epoch $t_1$, $t_2$ or $t_3$.

For epoch $t_1$ it is not necessary to apply the corresponding code compensation, since the rising edge of the first chip already arrives at Location A. For epoch $t_2$ and $t_3$, it is necessary to apply the corresponding code compensation, to ensure that the rising edge of the first chip arrives at Location A.

In the former description, the rising edge of the first chip is selected for the code compensation. Alternatively, it is possible to consider the falling edge of the first chip. Furthermore, the first chip of the spreading sequence is used to derive the code compensation applied on-board the satellite. Another chip of the spreading sequence could be used in place as "reference chip" as long as its definition is un-ambiguous within the spreading sequence. This is especially true for spreading sequences which are not periodic (case of cyphered spreading sequences).

More details and aspects are mentioned in connection with the embodiments described above or below. The embodiment shown in FIG. 9 may comprise one or more optional additional features corresponding to one or more aspects mentioned in connection with the proposed concept or one or more embodiments described above (e.g. FIGS. 1-8) or below (e.g. FIGS. 10-37).

FIG. 10 schematically illustrates the principle of code compensation (at a wider scale). The concept of code compensation is to ensure synchronization at reception for a specific earth position. The exact location on the earth for which the rising edge of the "reference chip" is received at a given epoch may be called Virtual Time Reference Station (VTRS). No "physical" reference station (i.e. receiver, facility, . . . ) needs to be located at the position of the VTRS. Furthermore, the epoch at which the rising edge of the "reference chip" is received at VTRS, may be called Reference Epoch, $t_{ref,VTRS}$. The corresponding appellations are introduced in FIG. 11.

In both navigation signal acquisition and tracking modes, the receiver usually computes the correlation between the received signal and a replica of it. The replica is generated with the same spreading sequence and it is offset with a so-called Code Delay estimate, $\tau_{est}$, which estimates the actual Code Delay, $\tau_{act}$ and multiplied with an exponential composed of the estimate Carrier Frequency, $f_{carrier,est}$, which estimates the actual (or apparent) $f_{carrier,act}$ and Carrier Phase Estimate $\varphi_{est}$:

$$r_{rep}(t) = \overline{c}(t - \tau_{est}) \times e^{j(2\pi f_{carrier,est}(t-\tau_{est}) + \varphi_{est})}$$

$$\overline{c}(t) = \sum_{i=1}^{N_c} (c_i \times p_c(t - i \times T_c) \times \Pi_{T_c}(t - i \times T_c))$$

$$\Pi_{T_c}(u) \begin{cases} 1 & \text{for } 0 \leq u \leq T_c \\ 0 & \text{else} \end{cases}$$

In the former expressions, $\overline{c}$ represents the spreading code composed of $N_c$ chips. Each chip value is equal to $c_i$ and is modulated with a pulse waveform $p_c$ (for example, BPSK or BOC). Furthermore, the function $\Pi_T$ is the so-called "temporal door" which is 1 within the interval [0,T] and 0 outside.

The following distinctions apply between the acquisition and tracking processing steps. In acquisition, the user device aims at providing coarse estimation of both code delay (with the code delay estimate $\tau_{est}$) and carrier frequency (with the carrier frequency estimate $f_{carrier,est}$) which are un-known if not existent a-priori. Without an accurate estimate of the actual carrier frequency $f_{carrier,act}$, the carrier phase, $\varphi_{est}$ is not estimated. The receiver (for example the user device) knows the reference carrier frequency, $f_{carrier}$ at transmission (e.g. 1575.742 MHz), but neither the additional Doppler (typically ranging between [−5 KHz and 5 KHz]) due to the dynamic (velocity) between satellite and user device, nor the actual frequency error offset (typically ranging between [−1 KHz and 1 KHz]), due the local clock stability. Therefore, the $f_{carrier,est}$ can also be expressed as $[f_{carrier} + f_{Doppler,est}]$, where $f_{Doppler,est}$ encompasses both Doppler and local clock frequency estimates. In acquisition mode, the accuracy for the code delay estimation error, (i.e. root mean square (r.m.s.) of $\tau_{est}$) is typically a fraction of a chip: code delay hypotheses spaced every half chip ($T_c/2$) or quarter of chip ($T_c/4$) are typically tested. Similarly, the accuracy for the apparent Doppler estimation error (i.e. r.m.s. of $f_{carrier,est}$) is expressed in tenth of Hertz: Doppler hypotheses are typically spaced with 10 to 50 Hz. Beside the accuracy of code and Doppler hypothesis, it may also be necessary to introduce different acquisition modes. In the so-called cold acquisition mode, the user device has no a priori knowledge on its position and its local time. It means that the user device has to test all possible Doppler offset but also code offsets corresponding to the spreading code sequence. Assuming a spreading code sequence of 1023 as for the GPS C/A signal components (resp. 4096 chip as for the Galileo E1-B or E1-C signal components), then 1023×2 (resp. 4096×2) for half chip spaced code hypotheses may be tested. In warm or hot acquisition modes, the receiver has a better knowledge on its position and time, together with the position of the transmitting navigation satellites, provided in so-called Almanacs. Only a limited number of Code and Doppler hypotheses may be tested.

In tracking, the user device has already gained a very good estimation, $f_{carrier,est}$, of the actual carrier frequency $f_{carrier,act}$, (i.e. including Doppler effects) for example with a Frequency Lock Loop (FLL) and of the code Delay, $\tau_{est}$, for example with a Delay Lock Loop (DLL). In comparison to the acquisition, the accuracy for code delay estimation error is expressed in meters or equivalently $T_c/100$ as order of magnitude. Similarly, the Doppler estimation error is expressed in Hz. In tracking mode, it is possible and necessary to estimate the carrier phase $\varphi_{est}$ (contrarily to the acquisition phase), for example with a Phase Lock Loop (PLL) or a Costas Loop. The carrier phase estimate is used to determine the symbol or data modulated onto the spreading sequences, or for very precise positioning where the phase estimate is used in combination to the code estimate in order to provide a very precise position of the user device (precision of a few decimeters).

For both, acquisition and tracking phases, the user device may compute a correlation between the received signal, and a replica generated with the estimate for code delay, carrier frequency and carrier phase (applicable for tracking):

$$R(\Delta\tau, \Delta f_{carrier}, \Delta\varphi_{carrier}) = \frac{1}{T_{int}} \int_0^{T_{int}} r_{rx}(t) \times r_{rep}(t) dt$$

$$(\Delta\tau, \Delta f_{carrier}, \Delta\varphi_{carrier}) =$$

$$\frac{1}{T_{int}} \int_0^{T_{int}} \frac{(\overline{c}(t-\tau_{est}) \times e^{j(2\pi f_{carrier,est}(t-\tau_{est})+\varphi_{est})}) \times}{(\overline{c}(t-\tau_{act}) \times e^{j(2\pi f_{carrier,act}(t-\tau_{act})+\varphi_{act})})} dt$$

$\Delta\tau = \tau_{act} - \tau_{est}$, $\Delta f_{carrier} = f_{carrier,act} - f_{carrier,est}$ and $\Delta\varphi_{carrier} = \varphi_{act} - \varphi_{est}$ In the equations above:

$r_{rx}(t)$ represents the received navigation signal reduced here, for simplification, to a single navigation signal component;

$r_{rep}(t)$ represents the replica generated at user device;

$T_{int}$ represents the coherent integration time, usually taken equal to the spreading code period (or a fraction of the spreading code period), or the symbol duration (applicable for data modulated GNSS signals); and $\Delta\tau$, $\Delta f_{carrier}$ and $\Delta\varphi$ respectively represent the estimation errors for the code, actual carrier frequency and carrier phase, as difference between the estimated code delay ($\tau_{est}$) and the actual code delay ($\tau_{act}$), the estimated carrier frequency ($f_{carrier,est}$) and the actual carrier frequency ($f_{carrier,act}$) and the estimated carrier phase ($\varphi_{est}$) and actual carrier phase ($\varphi_{act}$).

The "granularity" for the code, carrier frequency and carrier phase estimate may depend on the acquisition or tracking phase as explained above.

In acquisition phase, the receiver may compute the square of the absolute correlation function (suppressing in that way the dependency with respect to carrier phase) evaluated for each pair of code and Doppler hypotheses, yielding to an elementary power detector. In order to improve the detection performance different elementary power detectors can be added non-coherently, all calculated for the same Code and Doppler hypothesis, yielding to an aggregate power detector.

In tracking phase, the receiver may compute the correlation function for different code offsets surrounding the estimated one, $\tau_{est}$. For code offsets lower than the estimated one ($\tau_{est}$), for example $\tau_{est}$-$T_c/2$, and/or $\tau_{est}$-$T_c/4$, and/or $\tau_{est}$-$T_c/U$ (with U integer), ... the corresponding correlation function is called "Early Correlation function", also called "Early Correlation channel". For code offsets higher than the estimated one ($\tau_{est}$), for example $\tau_{est}$+$T_c/2$, and/or $\tau_{est}$+$T_c/4$, and/or $\tau_{est}$+$T_c/U$ (with U integer), ... the corresponding correlation function is called "Late Correlation function", also called "Late Correlation Channel". The receiver may then combine the corresponding Early and Late correlation functions in order to generate a so-called discriminator output which may serve for estimating the code delay $\tau_{est}$, for example within a Code Delay Lock Loop (DLL). The so-called "Prompt Correlation channel" calculated with the code delay estimate $\tau_{est}$, is used to retrieve the sign of the symbol modulated onto the navigation signal component, which is later used to derive the data information with demodulation techniques. As explained earlier the "Prompt Correlation Channel" can also serve for estimating the carrier phase, $\varphi_{est}$, for example by applying the atan operator to the ratio of the imaginary and real parts of the prompt correlation channel: $\varphi_{est}$=atan(Imag($R_{Prompt}$)/Real ($R_{Prompt}$)), which corresponds to the Carrier Phase estimator applied by Costas Loop (other algorithms not disclosed in this document can be used to retrieve the carrier phase).

More details and aspects are mentioned in connection with the embodiments described above or below. The embodiments shown in FIGS. 10 and 11 may comprise one or more optional additional features corresponding to one or more aspects mentioned in connection with the proposed concept or one or more embodiments described above (e.g. FIGS. 1-9) or below (e.g. FIGS. 12-37).

FIG. 12, FIG. 13 and FIG. 16 schematically illustrate user devices in the vicinity of a VTRS. In FIG. 12 the Line of Sight (LoS) between the VTRS and the satellite is tangent to the earth surface. In FIG. 13 the LoS is perfectly orthogonal with respect to the earth surface. In FIG. 16, the LoS is inclined with respect to the earth surface. Furthermore, on each figure the wavefronts corresponding to the rising edge of the chips are represented by arcs.

In FIG. 12, different user devices are represented in the vicinity of the VTRS. First, a "user device A" is assumed located exactly at VTRS. The corresponding user device may compute a correlation with a replica $r_{rep}(t)$ generated with the "un-shifted" spreading sequence $\overline{c}$, when $\tau_{est}$=0. This may be understood such that the chip stream starts with the first chip 1 of the spreading sequence. Furthermore, this replica keeps unchanged, while the received signal enters the correlation engine continuously, which enables to test the different code hypotheses at a sample rate. This type of acquisition technique is also called "passive acquisition", since the user device "waits" that the received signal becomes synchronized to the un-shifted spreading sequence, prepared in the acquisition module. When the correlation function generated in that way, reaches a peak, it means that the rising edge of the spreading sequence of the received signal $r_{rx}(t)$ exactly arrives at the VTRS, i.e. the User Device, and at the $t_{ref,VTRS}$ epoch. It means that the system time has been provided or "transferred" to the User Device, which can deduce the system time based on this event. A strong limitation to this "ideal" case is that the User Device usually ignores its exact position and especially in a cold acquisition.

The present disclosure is not limited to the case of a passive acquisition technique, but can also serve for active acquisition techniques. In a typical active acquisition technique, the user device does not keep the replica unchanged, but generates a different replica, according to the code and Doppler hypotheses to be tested, and correlates this newly generated replica with a completely new batch of received signal samples. The consequence is a lower rate for testing Code and Doppler hypotheses, but a lower complexity, when compared to the passive acquisition technique. When applying an active acquisition, it is possible to acquire a segment of the navigation signal transmitted with compensation, rather than the start of the corresponding navigation signal for passive acquisition. Considering that this segment of navigation signal can be related to its beginning, using a time-tag solution, such as a spreading code counter, or considering a very long spreading sequence, then it is also possible to synchronize the user device to the System Time, via this alternative time transfer approach.

Further, a "user device B" is located at "one chip distance" (for example 300 m if one considers the chip duration $T_c$ equal to 1 µs for the GPS C/A signal), and that the LoS is tangent to the earth surface (FIG. 12). If the "User Device B" is located 300 m from the VTRS and between the VTRS and satellite, the difference of reception time between the "User Device B" and the VTRS corresponds to the distance between VTRS and "User Device B", which may be expressed as algebraic value in seconds. It means that the correlation peak calculated with the un-shifted spreading sequence, may be observed at $[t_{ref,VTRS}-T_c]$, on an "absolute" time scale. If the User Device B is located "one chip distance" away from the VTRS and in the opposite side with respect to satellite, the correlation peak may be observed at $[t_{ref,VTRS}+T_c]$ on an "absolute" time scale. This can be repeated for different positions of the user device as shown in FIG. 12. Hence, this figure also shows that the wavefront corresponding to the rising edge of the reference chip defines a so-called "Reference Iso-chrone" representing the $t_{ref,VTRS}$. Any wavefront seen with 1 chip in advance or delay from the "Reference Iso-chrone" may correspond to 1 µs in advance or delay with respect to $t_{ref,VTRS}$, referred to the VTRS.

In FIG. 13, the satellite is located exactly at Zenith of VTRS. In FIG. 13 the "User Device A" located exactly at VTRS and "User Device B" located at the same position with respect to "User Device A" (i.e. VTRS) may be the same as in FIG. 12 before. The "User Device A" and "User Device B" also each prepare a replica $r_{rep}(t)$ generated with the "un-shifted" spreading sequence $\bar{c}$ (here considering a passive acquisition strategy). The main difference with respect to FIG. 12 is that, due to the very high inclination of Line of Sight between VTRS and satellite, the difference in reception time of the wavefront corresponding to the reference chip at VTRS (i.e. User Device A) and "User Device B" may be much smaller than in the case of FIG. 12. This difference of reception time can be measured as the difference of time (on the absolute time scale) when the correlation function reaches a peak at User Device A and when the correlation function reaches a peak at User Device B. The corresponding difference in reception time is a function of the satellite altitude: the higher the satellite altitude located at zenith of user device, the smaller the difference of reception time.

More details and aspects are mentioned in connection with the embodiments described above or below. The embodiments shown in FIGS. 12 and 13 may comprise one or more optional additional features corresponding to one or more aspects mentioned in connection with the proposed concept or one or more embodiments described above (e.g. FIGS. 1-11) or below (e.g. FIGS. 14-37).

FIG. 14 schematically illustrates parameters to be used in order to quantitatively determine the difference in reception time between a User Device A located exactly at VTRS and a User Device B located a distance 1 from the VTRS, in the specific case when the satellite is at Zenith of VTRS. In particular, L represents the distance between the satellite and the center of the earth, which is modelled as a perfect sphere of Radius R. The distance between the satellite and the User Device A, located at VTRS, and at Nadir of Satellite is P. The distance between the VTRS and the User Device B is denoted 1. Q and S represent the distance between the satellite and the User Device B, when it is located either on the left (S) or right (Q) side of the VTRS in the plane defined by the satellite, the earth center and user device B. Due to the symmetrical configuration, applicable when the satellite is at Zenith of the VTRS, Q=S.

More details and aspects are mentioned in connection with the embodiments described above or below. The embodiment shown in FIG. 14 may comprise one or more optional additional features corresponding to one or more aspects mentioned in connection with the proposed concept or one or more embodiments described above (e.g. FIGS. 1-13) or below (e.g. FIGS. 15-37).

FIG. 15 schematically illustrates difference in reception time over satellite altitudes for different distances between the User Device B and the VTRS. Based on the models described in FIG. 14, FIG. 15 shows that for typical satellite altitudes corresponding to GNSS system (between 20E3km and 25E3km), the difference in reception time is below 8 µs for a distance 1 smaller or equal to 150 km. This difference in reception time corresponds to the maximal error for the time transfer (synchronization to the system time). It increases to 25 µs for 300 km and reaches 300 µs for 1000 km. The difference of reception time shows the same order of magnitude for GEO satellites but is still slightly smaller due to the higher distance between satellite and VTRS, for example the user device A. It is worthwhile mentioning that for the specific case of GEO satellites, users at Nadir of the GEO satellites belong to the equatorial plane. On the opposite, for LEO satellites the difference in reception time increases as a direct consequence of the lower distance between the LEO satellite and the VTRS, for example the user device A. In that case, the main assumption of "earth surface flatness" applies for a smaller distance, 1, between user device B and VTRS, for example user device A. For other platforms, closer to the earth, such as HAPS, stratospheric Balloons or Drones, the distance 1 satisfying the "earth surface flatness" condition becomes even smaller. Nevertheless, the proposed scheme can still be applied for a service provided within a smaller surface area just below each HAPS, Balloon or Drone platform.

More details and aspects are mentioned in connection with the embodiments described above or below. The embodiment shown in FIG. 15 may comprise one or more optional additional features corresponding to one or more aspects mentioned in connection with the proposed concept or one or more embodiments described above (e.g. FIGS. 1-14) or below (e.g. FIGS. 16-37).

FIG. 16 describes the situation when the line of sight to the satellite is inclined with respect to the earth surface. The "User Device A", located exactly at VTRS and the "User Device B" located at the same position with respect to "User Device A" (i.e. VTRS) as in the figures above. Similarly to FIG. 14, the parameters used to determine quantitatively the difference in reception between the User Device A located exactly at VTRS and the User Device B located at a distance 1 from the VTRS are represented in FIG. 17. Especially important is the distance identified with (S-Q), and resp. (S-P), which corresponds to the time transfer error for the specific geometrical configuration according to the relative position of the User Device B with respect to the VTRS. Based on these parameters, FIG. 18 schematically illustrates the synchronization error as function of the elevation angle, considering the distance between the User Device and the VTRS. Here, following distances are considered: 300 m, 3 km, 30 km, 150 km, 192.96 km, 380.65 km and 1500 km. For the quantitative assessments the orbital parameters of a typical GNSS system in a Medium Earth Orbit (MEO) orbit are considered. The black curve in FIG. 18 corresponds to the situation when the user device is located between the VTRS and the satellite (case "S-P"), while the grey curves correspond to the situation when the VTRS is located between the User Device and the Satellite (case "Q-P"). In the legends the maximal synchronization error is also indicated, when the satellite is at zenith of VTRS (90° elevation from VTRS), or when it is tangent to the earth (0° elevation from VTRS), and finally when it shows a 50° elevation from VTRS. When the satellite elevation from VTRS is 0°, the synchronization error exactly corresponds to the distance 1 between the user device and the VTRS, which corresponds to the case in FIG. 12. The synchronization error is minimal when the satellite is at zenith of VTRS, which corresponds to the case in FIG. 13. The distance 1 equal to 192.96 km (resp. 380.65 km) represents a working point, since it corresponds to a synchronization error of ±0.5 ms (resp. ±1 ms).

The special case of an elevation of 50° with respect to the VTRS has been selected because it is shown that for a typical GNSS constellation, that any user and therefore the VTRS sees a satellite with 100% probability with an elevation smaller or equal to 50°, except for users located at latitudes lower than 25° for which the aforementioned probability decreases from 90% downwards, and users above 80° for which the aforementioned probability decreases also from 90% downwards. The probability to see two satellites above a specific elevation is also presented in FIG. 19. Here the probability to see two satellites becomes much smaller.

More details and aspects are mentioned in connection with the embodiments described above or below. The embodiment shown in FIGS. 16, 17, 18 and 19 may comprise one or more optional additional features corresponding to one or more aspects mentioned in connection with the proposed concept or one or more embodiments described above (e.g. FIGS. 1-15) or below (e.g. FIGS. 20-37).

FIG. 20 represents a sectorization of the earth with cells having a radius of 380.65 km, and a distance between cell centers of 2×380.65 km=761.3 km. Each VTRS is at the center of a "cell" with radius 380.65 km. This value is selected with respect to aforementioned calculations which show that any user away from the VTRS is able to recover the system time with an error of ±0.5 ms. It can be shown that P=1431 such cells exist. P represents the number of cells which cover the earth surface. Furthermore, FIG. 20 shows the footprints of each of the Q=24 GNSS satellites, when considering an elevation masking angle of 50°. Further, Q represents the number of satellites of the GNSS. The main orbital characteristics of the GNSS satellites are a Semi-Major Axis of 26400 km, and an inclination of 55 degrees. Here different grey colors are used to represent each of the 24 footprints. For example, 80 VTRS, and therefore cells can be defined, as part of the visibility footprint of the satellite with a minimal elevation of 50°.

More details and aspects are mentioned in connection with the embodiments described above or below. The embodiment shown in FIG. 20 may comprise one or more optional additional features corresponding to one or more aspects mentioned in connection with the proposed concept or one or more embodiments described above (e.g. FIGS. 1-19) or below (e.g. FIGS. 21-37).

FIG. 21 represents a similar representation but for a cell radius of 192.96 km (instead of 380.65 km). Here, each user belonging to this cell shall have a maximal synchronization error of ±1 ms. In that case, the number of cells increases to P=5408 cells, and on average 615 cells belong to a visibility footprint with 50 degrees in elevation.

More details and aspects are mentioned in connection with the embodiments described above or below. The embodiment shown in FIG. 21 may comprise one or more optional additional features corresponding to one or more aspects mentioned in connection with the proposed concept or one or more embodiments described above (e.g. FIGS. 1-20) or below (e.g. FIGS. 22-37).

FIG. 22 schematically illustrates geometrical positions of a satellite transmitting a positioning signal and a user equipment (herein also called user device), and different contributions to the pseudo-ranges for an exemplary LOS. Herein, reference is made to ["Understanding GPS Principles and Application", Kaplan Artech House Publish, ISBN 0-89006-793-7], wherein similar notations are applied. This concerns especially the following parameters and variables applied in FIG. 22, and explained as follows:

$R_r^s$ represents a true ("Physical") distance between a satellite and a user equipment;

$t_s$ represents a time of transmission expressed in the System Time scale;

$t_r$ represents a time of reception expressed in the System Time scale;

$\tau_s$ represents a clock offset between the satellite Local Time and the System Time scale and evaluated at time of transmission. Per convention the clock offset is positive when the clock is delayed with respect to time scale;

$\tau_r$ represents a clock offset between the receiver local time and the System Time scale and evaluated at time of reception;

$\tau_I^s$ represents a contribution of a Ionosphere onto a propagation delay;

$\tau_T^s$ represents a contribution of a Troposphere onto the propagation delay;

$\tau_{MP}^s$ represents a contribution of a local Multipath onto the propagation delay estimation;

$\tau_{RFI}^s$ represents a contribution of a local Radio Frequency Interference (RFI) onto the propagation delay estimation;

$\tau_{N0}^s$ represents a contribution of thermal noise onto the propagation delay estimation;

$[x_r\ y_r\ z_r]^T$ represents a coordinate vector of the user equipment to be estimated;

$[x_s\ y_s\ z_s]^T$ represents a coordinate vector of a true satellite position; and $[\hat{x}_s\ \hat{y}_s\ \hat{z}_s]^T$ represents a coordinate vector of the predicted satellite position, which is usually computed (estimated) based on models computed in the central processing facility of a navigation system and encoded onto the navigation signal.

Alternatively the predicted satellite position can also be computed based on models provided by another navigation service operator and made available to the user equipment via another mean, such as the internet. Alternatively, the predicted satellite position can also be generated by the user equipment itself, based on an orbit propagator.

Assuming an "ideal" satellite and receiver/user equipment clock (free of drift), the distance between satellite and user equipment is given by the following equation, where $c_0$ represents the speed of light:

$$R_r^s = c_0 \cdot (t_r - t_s) \tag{eq. 1}$$

Due to the clock offsets at satellite and user equipment, the pseudo-range (PR) expression, without any additional perturbing contributions, can be derived by the former equation as:

$$PR_r^s = c_0 \cdot ((t_r + \tau_r) - (t_s + \tau_s)) = R_r^s + c_0 \cdot (\tau_r - \tau_s) \tag{eq. 2}$$

The true satellite to user equipment distance can also be expressed as $$R_r^s = \sqrt{(x_s - x_r)^2 + (y_s - y_r)^2 + (z_s - z_r)^2} \tag{eq. 3}$$

(eq. 2) can be rewritten as follows, when accounting now for all other contributions to the pseudo-range measurement:

$$PR_r^s = \sqrt{(x_s-x_r)^2+(y_s-y_r)^2+(z_s-z_r)^2}+c_0\cdot(\tau_r-\tau_s)+\Sigma_i^s+\tau_T^s+\tau_{RFI}^s+\tau_{MP}^s+\tau_{N0}^s \quad (eq. 3)$$

More details and aspects are mentioned in connection with the embodiments described above or below. The embodiment shown in FIG. 22 may comprise one or more optional additional features corresponding to one or more aspects mentioned in connection with the proposed concept or one or more embodiments described above (e.g. FIGS. 1-21) or below (e.g. FIGS. 23-37).

FIG. 23 schematically illustrates time propagation between satellite and a VTRS. The Reference Station is virtual and similar pseudo-range measurement parameters can be expressed:

both contributions for the multipath ($\tau_{MP,vtrs}^s$) and thermal noise ($\tau_{N0,vtrs}^s$) $\tau_r$ at VTRS are not applicable here; and the time offset $\tau_{vtrs}$ at VTRS is assumed zero, which means that the VTRS is exactly synchronized to the system time at reception of the ranging signal since the VTRS reflects (without drift) the system time.

For the contributions for the Ionosphere ($\tau_{I,vtrs}^s$) and troposphere ($\tau_{T,vtrs}^s$) onto the delay two options are provided.

The first option considers that both contributions are not part of the code compensation at VTRS. In that case, the user device experiences an "absolute" error accounting for both effects when synchronizing with the ranging signals transmitted by the satellite, and comprising the code compensation. Nevertheless, the application of estimation models for both Iono-sphere (e.g. Necquick Model) and Tropo-sphere (with the Zenithal Hydrostatic and Zenith Wet Delays) effects at user side enables reduction of corresponding contributions.

The second option considers that both contributions are part of the code compensation at VTRS. It means that a User Device A, located at VTRS itself has not to account (i.e. correct) for both ionospheric and tropospheric delays, since already accounted in the compensation. For a User Device B not located exactly at VTRS, the synchronization error equals the sum of the difference between the actual ionosphere/tropospheric delays at User Device B and ionosphere/tropospheric delays at VTRS. The further the User Device B is away from the VTRS, the larger these effects.

Based on these assumptions, the expression for the Pseudo-Range at VTRS becomes the following:

Option 1, if the Tropospheric and Ionospheric delays (at VTRS) are not compensated at VTRS:

$$PR_{vtrs}^s = \sqrt{(x_s-x_{vtrs})^2+(y_s-y_{vtrs})^2+(z_s-z_{vtrs})^2}+c_0\cdot(-\tau_s)+\tau_{I,vtrs}^s+\tau_{T,vtrs}^s \quad (eq.\ 5)$$

Option 2, if the Tropospheric and Ionospheric delays (at VTRS) are compensated at VTRS:

$$PR_{vtrs}^s = \sqrt{(x_s-x_{vtrs})^2+(y_s-y_{vtrs})^2+(z_s-z_{vtrs})^2}+c_0\cdot(-\tau_s) \quad (eq.\ 6)$$

Based on these introductory works, the method used to derive the code compensation can be presented. Assuming no Ionospheric and Tropospheric contribution, then the first chip of the spreading sequence has to leave at time $$t_{global}^s = t_{vtrs}^{r,ref} - ((\sqrt{(x_s-x_{vtrs})^2+(y_s-y_{vtrs})^2+(z_s-z_{vtrs})^2})/c_0)$$

the satellite antenna phase center in order for this first chip to reach the VTRS at a reception reference time $t_{vtrs}^{r,ref}$. Here $t_{global}^s$ is expressed in the System Time reference. Due to the clock offset $\tau_s$ between the Satellite local time (i.e. clock) and the System Time reference, the first chip of the spreading sequence has to leave at time $t_{local}^s$, with $$t_{local}^s = t_{vtrs}^{r,ref} - ((\sqrt{(x_s-x_{vtrs})^2+(y_s-y_{vtrs})^2+(z_s-z_{vtrs})^2})/c_0 + (-\tau_s))$$

where $t_{local}^s$ is expressed in the Local System Time reference. Similarly, when considering the Ionospheric and Tropospheric contributions, then the first chip of the spreading sequence has to leave at time $$t_{global}^s = t_{vtrs}^{r,ref} - ((\sqrt{(x_s-x_{vtrs})^2+(y_s-y_{vtrs})^2+(z_s-z_{vtrs})^2})/c_0 + \tau_{I,vtrs}^s + \tau_{T,vtrs}^s)$$

when expressed in the System Time reference, and at time $$t_{local}^s = t_{vtrs}^{r,ref} - ((\sqrt{(x_s-x_{vtrs})^2+(y_s-y_{vtrs})^2+(z_s-z_{vtrs})^2})/c_0 + (-\tau_s) + \tau_{I,vtrs}^s + \tau_{T,vtrs}^s)$$

when expressed in the Local System Time reference. The clock offset $\tau_s$ can either be accessed by the satellite directly from the user navigation message which is available at satellite for later broadcasting, or be provided to the satellite with a dedicated communication link.

The code compensation $\tau_{comp}$ then corresponds to the delay between the epoch of transmission ($t_{global}^s$ or $t_{local}^s$) and the reference time at VTRS at $t_{vtrs,ref}$. The code compensation serves to trigger the transmission of the spreading sequence, such that when the first chip of the spreading sequence leaves the antenna phase center at $t_{global}^s$ (if expressed in the GNSS system time), or at $t_{local}^s$ (if expressed in the satellite local time), then the first chip of the spreading sequence reaches the VTRS at $t_{vtrs,ref}$. This later case shall correspond to the more realistic implementation since the satellite will use its local time to trigger the transmission of the spreading sequence. Hence, the code compensation consists then to apply a physical delay $\tau_{comp}$ to the actual satellite clock offset, $\tau_s$. Based on equations (eq. 5) and (eq. 6), the corresponding code compensation is then equal to eq. 7, when the Iono- and Tropospheric Delays are compensated and eq. 8, when Iono- and Tropospheric Delays are not compensated.

$$\tau_{comp} = (\sqrt{(x_s-x_{vtrs})^2+(y_s-y_{vtrs})^2+(z_s-z_{vtrs})^2})/c_0 + (-\tau_s) + \tau_{I,vtrs}^s + \tau_{T,vtrs}^s \quad (eq.\ 7)$$

In the following, the measured pseudo-range is derived for a user device which tracks navigation signal generated with code compensation. The general expression for the code pseudorange at user level, (eq. 4), once the code compensation is applied, becomes:

$$PR_r^s = \sqrt{(x_s-x_r)^2+(y_s-y_r)^2+(z_s-z_r)^2}+c_0\cdot(\tau_r-\tau_s-\tau_{comp})+\tau_I^s+\tau_T^s+\tau_{RFI}^s+\tau_{MP}^s+\tau_{N0}^s \quad (eq.\ 9)$$

When applying the Code compensation not encompassing the tropospheric and ionospheric delay (see eq. 8), the former equation becomes following:

$$PR_r^s = \sqrt{(x_s-x_r)^2+(y_s-y_r)^2+(z_s-z_r)^2} - \sqrt{(x_s-x_{vtrs})^2+(y_s-y_{vtrs})^2+(z_s-z_{vtrs})^2} + \ldots c_0\cdot\tau_r + \tau_I^s+\tau_T^s+\tau_{RFI}^s+\tau_{MP}^s+\tau_{N0}^s \quad (eq.\ 10)$$

When applying the Code compensation encompassing the tropospheric and ionospheric delay (see eq. 7), the former equation becomes following:

$$PR_r^s = \sqrt{(x_s - x_r)^2 + (y_s - y_r)^2 + (z_s - z_r)^2} - \qquad \text{(eq. 11)}$$
$$\sqrt{(x_s - x_{vtrs})^2 + (y_s - y_{vtrs})^2 + (z_s - z_{vtrs})^2} + \ldots c_0 \cdot \tau_r +$$
$$(\tau_I^s - \tau_{I,vtrs}^s) + (\tau_T^s - \tau_{T,vtrs}^s) + \tau_{RFI}^s + \tau_{MP}^s + \tau_{NO}^s$$

From (eq. 10) and (eq. 11) it can be observed that the code compensation enables to avoid providing to the user the satellite clock offset, $\tau_s$, since it disappears with the code compensation. Furthermore, neglecting local and atmospheric contributions to the user pseudorange then the former expressions reduces to $$PR_r^s \approx \frac{\sqrt{(x_s-x_r)^2+(y_s-y_r)^2+(z_s-z_r)^2} \times -}{\sqrt{(x_s-x_{vtrs})^2+(y_s-y_{vtrs})^2+(z_s-z_{vtrs})^2}} \qquad \text{(eq. 12)}$$

This expression corresponds to the Time Difference Of Arrival (TDOA) between the VTRS and the user device, when transmitted by the satellite.

Another option regarding the calculation of the code compensation consists to not compensate neither for the satellite clock offset, $\tau_s$, nor for the tropospheric and ionospheric delays, and only to account for the propagation time between satellite and the VTRS as described hereafter.

$$\tau_{comp} = (\sqrt{(x_s-x_{vtrs})^2+(y_s-y_{vtrs})^2+(z_s-z_{vtrs})^2})/c_0 \qquad \text{(eq. 12)}$$

In that case the expression of the measured pseudo-range for a user device becomes:

$$PR_r^s = \sqrt{(x_s - x_r)^2 + (y_s - y_r)^2 + (z_s - z_r)^2} - \qquad \text{(eq. 13)}$$
$$\sqrt{(x_s - x_{vtrs})^2 + (y_s - y_{vtrs})^2 + (z_s - z_{vtrs})^2} \ldots +$$
$$c_0 \cdot (\tau_r - \tau_s) + \tau_I^s + \tau_T^s + \tau_{RFI}^s + \tau_{MP}^s + \tau_{NO}^s$$

In one or more aspect, the code acquisition search may be reduced by considering that the cell repartition covers uniformly the earth surface, as shown in the illustrative FIGS. 20 and 21, and that a specific spreading sequence is allotted for each pair of cell-satellite. It means that when the satellite with identifier Sat-ID-q transmits a navigation signal component to a Cell with identifier Cell-ID-p, the corresponding signal is modulated with a specific spreading sequence $PRN_{Sat-ID-q, Cell-ID-p}$. This spreading sequence, $PRN_{Sat-ID-q, Cell-ID-p1}$, is different to the spreading sequence $PRN_{Sat-ID-q, Cell-ID-p2}$ used to modulate the navigation signal component transmitted by the Satellite with identifier Sat-ID-q towards the cell with identifier Cell-ID-p2. The spreading sequence, $PRN_{Sat-ID-q1, Cell-ID-p}$, can but does not have to be different to the spreading sequence $PRN_{Sat-ID-q2, Cell-ID-p}$ used to modulate the navigation signal component transmitted by the Satellite with identifier Sat-ID-q2 towards the cell with identifier Cell-ID-p. Hence, a Look-Up table for the Spreading Code allocation exists between the P cells and the Q satellites. It is recalled that for conventional satellite navigation system, a single spreading sequence is allotted per satellite for each navigation signal component. One candidate implementation for the acquisition of the signal transmitted by satellite with Sat-ID-q is an acquisition bank made of P individual passive acquisition modules having each a replica based on an un-shifted spreading sequence $PRN_{Sat-ID-q, Cell-ID-p}$ corresponding to the $p^{th}$ cell and $q^{th}$ satellite. A similar architecture can be a bank of active acquisition modules, each testing a different set of Code and Doppler hypotheses, corresponding to each of the $PRN_{Sat-ID-q, Cell-ID-p}$.

More details and aspects are mentioned in connection with the embodiments described above or below. The embodiment shown in FIG. 23 may comprise one or more optional additional features corresponding to one or more aspects mentioned in connection with the proposed concept or one or more embodiments described above (e.g. FIGS. 1-22) or below (e.g. FIGS. 24-37).

If the user device has an a priori regarding its rough position on the earth surface, that is to say the candidate cells where the user device can potentially be part of, only a sub-set of acquisition modules corresponding to the cells which belongs to this a-priori is then necessary. A high-level description of the corresponding acquisition bank, comprising 13 individual passive acquisition modules, corresponding to 13 cells forming a dense mesh over the earth surface is illustrated in FIG. 24. At reception of the navigation signal component transmitted by satellite Sat-ID-q, only one module out of the Q experiences a correlation peak. The user device in FIG. 24 belongs to the cell with Cell-ID-10, and the output of the passive acquisition module 10 experiences a peak. The allocation of the spreading codes to cells enables to reduce the overall time uncertainty since a peak observed at the output of one of the passive acquisition modules provides already an information on the user device position within the corresponding cell. This feature enables to dimension the length of the spreading code sequence, as explained hereafter.

More details and aspects are mentioned in connection with the embodiments described above or below. The embodiment shown in FIG. 24 may comprise one or more optional additional features corresponding to one or more aspects mentioned in connection with the proposed concept or one or more embodiments described above (e.g. FIGS. 1-23) or below (e.g. FIGS. 25-37).

In FIG. 12, the difference in reception time of the wavefront corresponding to the reference chip at VTRS (i.e. User Device A) and "User Device B" for a satellite is tangent to the earth surface (exactly) corresponds to the distance (once expressed in unit of time) between the VTRS and the User Device B. As a matter of fact, the spreading sequence defines a circular area with center at cell center and radius equals to the spreading code period (once expressed in meters). In the following, this area is called the Code Acquisition Search Area to Cell-ID-q. In cold acquisition, i.e. when the User Device has no a priori about its position, the maximal time uncertainty to be scrutinized is therefore equal to the spreading code sequence length. Indeed, it is considered that a time transfer can be achieved with the center of the neighbored areas, possibly with another reference time for the corresponding $t_{Ref,VTRS*}$ (where VTRS* represents the VTRS at the center of the neighbored cell). The maximal time uncertainty and the underlying spreading sequence duration, thus depend on the distance between two neighbored cells, which is also called inter-cell distance, but also on the ability of the Code Acquisition Search Areas to fully "cover" the earth surface. At maximum, the duration of the Spreading Code sequence equals the inter-cell distance (once expressed in time unit). This is represented on the left part in FIG. 25, when a maximal overlap applies between the acquisition search areas associated to neighbored cells. For example, assuming an inter-cell distance of 380.65 km (as per FIG. 20) and a chip rate of $R_c=1$ MCps, i.e. $T_c=1$ μs or 300 m, then the length for the underlying spreading sequence shall be 1268 chips. On the right part in FIG. 25, the spreading code length once expressed in meters is smaller than the inter-cell distance. For the same chip rate, this corresponds for example to a spreading code length of 1023 chips. This yields to a smaller overlap between the acquisition search areas associated to both neighbored cells. It means that the code length may not be sufficient.

More details and aspects are mentioned in connection with the embodiments described above or below. The embodiment shown in FIG. 25 may comprise one or more optional additional features corresponding to one or more aspects mentioned in connection with the proposed concept or one or more embodiments described above (e.g. FIGS. 1-24) or below (e.g. FIGS. 26-37).

At the end, minimal and optimal spreading code length may need to ensure that the overlap of the acquisition search areas, associated to all cells, covers the whole earth surface. This may then correspond to the optimal code length. This is illustrated in the middle part in FIG. 26. FIG. 26 shows on the left part the situation corresponding to the maximal spreading code sequence length, on the middle part the situation corresponding to the optimal spreading code sequence length and on the right part the situation where the spreading code sequence length is not sufficient. In the latter case, it can be observed that the user device is not part of any acquisition search areas, meaning that its acquisition performance is strongly degraded.

Once the spreading code length has been optimally dimensioned, based on the inter-cell distance, it is then necessary to facilitate the user device to identify the number of spreading sequences that have passed through the user device since the first spreading sequence, and the one which has been used to successfully acquire and track the navigation signal stream. Indeed, from the acquisition process, the user device may synchronize its locally generated and shifted replica with the received signal, and especially with a portion of the received signal comprising a spreading sequence which is distant of "r" spreading sequences to the first transmitted spreading sequence and whose first chip arrives at $t_{ref,VTRS}$ at the VTRS. Then the user device will track with the DLL the navigation signal, once synchronized to it. Hence an ambiguity, related to the actual occurrence of the spreading sequence, currently processed by the user device, since the first spreading sequence may need to be solved in order to deduce r, and thus to enable the user device to synchronize to the system time.

More details and aspects are mentioned in connection with the embodiments described above or below. The embodiment shown in FIG. 26 may comprise one or more optional additional features corresponding to one or more aspects mentioned in connection with the proposed concept or one or more embodiments described above (e.g. FIGS. 1-25) or below (e.g. FIGS. 27-37).

In one or more aspects, the navigation signal may include an information for the code sequence counter for the first spreading sequence and which enables to deduce r. First and second implementations may be used for this purpose.

In FIG. 27, the first implementation modulates a code sequence counter onto the spreading sequence, as part of the navigation data. In the same figure, the actual occurrence of the spreading sequence for which the user device is synchronized (i.e. a clear peak of the correlation function is observed) is equal to r=5, for illustration purposes. It means that since the first chip of the first spreading sequence arrived to the VTRS (i.e. cell center), 5 spreading sequences occurred.

More details and aspects are mentioned in connection with the embodiments described above or below. The embodiment shown in FIG. 27 may comprise one or more optional additional features corresponding to one or more aspects mentioned in connection with the proposed concept or one or more embodiments described above (e.g. FIGS. 1-26) or below (e.g. FIGS. 28-37).

In FIG. 28, the second implementation applies a shift to the spreading sequence for each new spreading sequence epoch (r), where the shift depends on the spreading sequence occurrence, r, since the first spreading sequence. The spreading sequence counter may also be called Code Shift Keying. After synchronization on the 5th occurrence of the spreading sequence (value again used for illustration purpose) the user device is able to derive from the different shifts applying between different consecutive spreading sequences, the value for the actual occurrence of the spreading sequence.

In one or more aspects, the Doppler acquisition search may be reduced by controlling the offset between actual carrier frequency, $f_{carrier,RF}$ of the transmitted signal and the reference carrier frequency $f_{carrier}$ (e.g. 1575.45 MHz as for the GPS L1 C/A signal component), in such a way that the actual Doppler observed at VTRS is zero.

The following equation provides the general expression for the Doppler experienced at a terrestrial users when receiving a signal, transmitted by a satellite.

$$\Delta f_{Dopp}(\text{user}) = -\left( \frac{(\vec{P_r} - \vec{P_s})^T (\vec{V_r} - \vec{V_s})}{\|(\vec{P_r} - \vec{P_s})\| c_0} \right) f_{carr} \quad \text{(eq. 14)}$$

Where $f_{carr}$ designates the carrier frequency transmitted by the satellite $\Delta f_{Dopp}$ designates the Doppler offset as difference between the received frequency $f_{carr}$ and the transmitted carrier frequency $f_{carr}$ $\vec{P_r}$ (resp. $\vec{P_e}$) designate the position vector of the receiver (transmitter respectively)

$\vec{V_r}$ (resp. $\vec{V_e}$) designate the velocity vector of the receiver (transmitter respectively)

Applying the former expression to the VTRS enables to deduce the Doppler offset experienced at VTRS. The application of the Doppler compensation means that the actual transmitted frequency shall be corrected with $\Delta f_{carr,comp}$ by subtracting with $\Delta f_{Dopp}$(VTRS), as computed with the position and velocity of the VTRS.

It is worth highlighting that the Doppler compensation is performed for a VTRS, where no physical device has to be present, which is one particularity of the proposed concept.

More details and aspects are mentioned in connection with the embodiments described above or below. The embodiment shown in FIG. 28 may comprise one or more optional additional features corresponding to one or more aspects mentioned in connection with the proposed concept or one or more embodiments described above (e.g. FIGS. 1-27) or below (e.g. FIGS. 29-37).

FIG. 29 schematically illustrates geographical variations of the actual received Doppler, as difference between the actual received carrier frequency and the reference carrier frequency, when the frequency of the RF signal transmitted at the satellite equals the reference carrier frequency (for example 1575.45 MHz). The determination of the actual received Doppler does not account neither the user dynamic, nor the stability of the user equipment clocks. The geographical variations of the actual received Doppler are represented within the visibility footprint, based on a minimal elevation angle of 5°, for the GNSS satellite 1. In FIG. 29, two representations are shown, a first representation based on isolines of Doppler which enables to see the cell centers, and a second representation which shows filled areas where the actual Doppler belongs to the ranges defined by the aforementioned isolines. For a cell radius of 380.6 km and a minimal elevation angle of 5°, 481 cells are included within the corresponding visibility footprint. Further, within a satellite visibility footprint, the Doppler spans between ~-4001 Hz and +4001 Hz, yielding an overall variation of 8002 Hz. The consequence of this large range of Doppler due to the dynamic of the satellite-to-user link is that the user may have to test a large number of Doppler hypotheses. Assuming for example a spacing between two consecutive Doppler hypotheses, also called Doppler bin width, of 50 Hz, may then yield to test 160 Doppler hypotheses.

More details and aspects are mentioned in connection with the embodiments described above or below. The embodiment shown in FIG. 29 may comprise one or more optional additional features corresponding to one or more aspects mentioned in connection with the proposed concept or one or more embodiments described above (e.g. FIGS. 1-28) or below (e.g. FIGS. 30-37).

FIG. 30 schematically illustrates a similar representation as FIG. 29, when considering a visibility footprint based on a minimal elevation angle of 40°, still for the GNSS satellite 1. For a cell radius of 380.6 km and a minimal elevation angle of 40°, it can be seen that 161 cells are included within the corresponding visibility footprint.

In order to reduce the corresponding number of Doppler hypotheses, the carrier frequency of the RF signal transmitted at the satellite may be offset by a value, $\Delta f_{carr,comp}$ such that the actual received carrier frequency at the cell center, which represents a VTRS according to the afore description, is null. It means that when the satellite is transmitted to each cell, the aforementioned carrier frequency offset at satellite level may depend on the actual velocity of the satellite, and the position of the VTRS (i.e. cell center), and may therefore vary from cell center to cell center.

More details and aspects are mentioned in connection with the embodiments described above or below. The embodiment shown in FIG. 30 may comprise one or more optional additional features corresponding to one or more aspects mentioned in connection with the proposed concept or one or more embodiments described above (e.g. FIGS. 1-29) or below (e.g. FIGS. 31-37).

FIG. 31 schematically illustrates Doppler variations within each of the aforementioned 161 cells, when applying the Doppler compensation. In order to better show the reduction of the corresponding Doppler excursion within each cell, two close-ins provided for one cell located in the lower part of the visibility footprint, and for another cell in the middle part of the visibility footprint. For the first cell, the Doppler variations reduce from 6840 Hz (without Doppler compensation) down to 368.5 Hz (factor ~19), while for the second cell, the Doppler variations reduce from 3840 Hz (without Doppler compensation) down to 565.5 Hz (factor ~12). It also means that for the first cell, a user located within the corresponding cell may have to test at maximum 8 Doppler bins, while for the second cell, a user located within the corresponding cell may have to test at maximum 12 Doppler bins for a Doppler bin width of 50 Hz.

More details and aspects are mentioned in connection with the embodiments described above or below. The embodiment shown in FIG. 31 may comprise one or more optional additional features corresponding to one or more aspects mentioned in connection with the proposed concept or one or more embodiments described above (e.g. FIGS. 1-30) or below (e.g. FIGS. 32-37).

FIG. 32 schematically illustrates a maximal Doppler variation when applying Doppler compensation for each of the 161 cells. The values of 368.5 Hz and 565.5 Hz can be effectively retrieved from the figure as well. It can be verified that the Doppler span ranges between 300 Hz (i.e. 6 Doppler hypotheses) and 562.5 (i.e. 12 Doppler hypotheses).

First and second implementations may be used for a corresponding Doppler compensation. The first implementation may offset the frequency generated by the Frequency and Time Generation Unit (FTGU), $f_{ftgu,act}$ with an offset $\Delta f_{ftgu}$ such that $f_{ftgu,act}=f_{ftgu}+\Delta f_{ftgu}$, where the corresponding offset is proportional to the offset $\Delta f_{carr,comp}$ applied to the transmitted RF carrier. The corresponding offset may account for the different steps of up-conversion between the nominal frequency $f_{ftgu}$ of the FTGU and the reference carrier $f_{carr}$. The second implementation may apply an offset to the signal generated within the Navigation Signal Generation Unit (NSGU). The NSGU is then fed with the unmodified nominal frequency $f_{ftgu,act}=f_{ftgu}$, and may apply an offset $\Delta f_{nsgu}$ to the frequency of the output signal, either in the analogue or in the digital domain (depending on the actual configuration of the NSGU), which yield to the actual carrier frequency of the NSGU output: $f_{nsgu,act}=f_{nsgu}+\Delta f_{nsgu}$, where the corresponding offset $\Delta f_{nsgu}$ is proportional to the offset $\Delta f_{carr,comp}$ applied to the transmitted RF carrier.

Further, the Doppler compensation can be applied continuously over time at navigation signal generation chain.

Further, the user device may know (in advance) the exact position of the VTRS as well as the reference time $t_{ref,VTRS}$. When considering (a network of) cells, an ensemble of pairs comprising each the exact position of the VTRS (or equivalently the cell center) and reference times, $t_{ref,VTRS}$ at each cell center may be made available to the user device. Here a Look-Up table of VTRS positions and reference time can then be generated. Such information can for example be provided in the user navigation message, transmitted earlier to the user device, which enables to update the corresponding look-up table. The corresponding information can also be made available via a so-called third channel, or communication channel that is available at user device, for example using the terrestrial communication networks. The corresponding information can also be "hardcoded" in the user device, letting less possibly to modify the corresponding Look-up table. It is further outlined that different reference times for each VTRS can be applied, in order to ensure time transfer and ease acquisition, over time.

Further, the VTRS can be a "static VTRS" or a "moving VTRS" for which the trajectory can be known in advance by the user device, as well as the reference time, $t_{ref,vtrs}$ when the raising edge of the first chip arrives at the moving VTRS according to the known trajectory. This situation is illustrated in FIG. 33.

More details and aspects are mentioned in connection with the embodiments described above or below. The embodiments shown in FIGS. 32 and 33 may comprise one or more optional additional features corresponding to one or more aspects mentioned in connection with the proposed concept or one or more embodiments described above (e.g. FIGS. 1-31) or below (e.g. FIGS. 34-37).

FIG. 34, FIG. 35 and FIG. 36 show alternative platforms that could be used to host the signal generation chain implementing the code compensation according to the present disclosure. FIG. 34 illustrates the case of a (stratospheric) balloon. FIG. 35 illustrates the case of a High-Altitude Platform Station (HAPS). FIG. 36 illustrates the case of a terrestrial station, here a Base Transceiver Station, but the case of a Pseudolite can also be considered in place.

More details and aspects are mentioned in connection with the embodiments described above or below. The embodiments shown in FIGS. 34, 35 and 36 may comprise one or more optional additional features corresponding to one or more aspects mentioned in connection with the proposed concept or one or more embodiments described above (e.g. FIGS. 1-33) or below (e.g. FIG. 37).

FIG. 37 schematically illustrates an application of the code compensation when applied to HAPS. In this example three HAPS are represented, as well as three VTRS, whose distance is consistent with the assessments related to the necessary spreading code length to ensure a faster acquisition. With respect to satellites, the advantage of HAPS is their lower dynamic, together with the lower investment need for their development, deployment and operation. Furthermore, another advantage of HAPS is the possibility to put them onto operation over (populated) regions where demanded. In that way "wasting" HAPS platform over regions without this demand is avoided. The precise HAPS position is needed in order to ensure accurate code and Doppler compensation. One approach to solve this issue can consists in implementing a multi-GNSS receiver on-board the HAPS platform which will provide exact position as well as time with respect to GNSS time scale referential. Based on this information, it is possible to generate the code and Doppler compensation in order to ensure synchronization at the VTRS. The principle for the generation of the Code and Doppler compensation is then similar to the one presented in FIG. 9.

More details and aspects are mentioned in connection with the embodiments described above or below. The embodiment shown in FIG. 37 may comprise one or more optional additional features corresponding to one or more aspects mentioned in connection with the proposed concept or one or more embodiments described above (e.g. FIGS. 1-36) or below.

In one or more embodiments, code compensation may be performed ensuring that the rising or falling edge of a reference chip arrives at a time $t_{ref,VTRS}$ at a so-called Virtual Timing Reference Station (VTRS).

In one or more embodiments, (a network of) cells may be provided whose centers are VTRS.

In one or more embodiments, code compensation determination may account for the clock offset of navigation signal source with respect to system time, the position of the navigation signal generation as well as the position of the VTRS and the reference time $t_{ref,VTRS}$. The code compensation determination can but does not have to account for the ionospheric and tropospheric delay experienced at VTRS and at $t_{ref,VTRS}$.

In one or more embodiments, code length may be derived based on the inter-cell distance.

In one or more embodiments, the navigation signal may comprise a Spreading Code counter which counts the number of spreading codes since the first spreading code comprising the reference chip.

In one or more embodiments, Doppler compensation may ensure that the actual Doppler is zero at the VTRS. The Doppler compensation may account for the exact VTRS position, the satellite orbit, and the reference carrier frequency.

In one or more embodiments, the exact position of the VTRS and the reference time $t_{ref,vtrs}$ may be made available to the user device or are hard coded.

In one or more embodiments, the VTRS can follow a trajectory which is known from user device, and the exact position when the reference chip arrives at the reference trajectory at a reference time $t_{ref,VTRS}$ is also known by the user device.

In one or more embodiments, the platforms hosting the navigation signal generation implementing the code and Doppler compensation as well as the corresponding signal features can be a space-based station such as a Navigation Satellite at a Medium Earth Orbit (MEO), a Low Earth Obit (LEO) or a GEO stationary satellites (GEO). The platforms can also be a near earth platform such as a High Altitude Platform (HAPS), a (stratospheric) Balloons or a Drone. The platforms can also be a static terrestrial platform, such as Base Transceiver Stations (BTS) used in general for terrestrial mobile network infrastructures, or such as terrestrial Navigation Beacons, also called Pseudo-satellites or Pseudolites.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A platform comprising:
a signal generation unit configured to generate a spreading code sequence, wherein the spreading code sequence has a reference chip with a rising edge and a falling edge, and wherein the signal generation unit is further configured to adjust the spreading code sequence to ensure that the rising edge or the falling edge of the reference chip arrives at a Virtual Timing Reference Station, VTRS, on a predetermined time (tref,VTRS); and
a transmitting unit configured to engage with the signal generation unit and configured to transmit the spreading code sequence.

2. The platform according to claim 1, wherein the VTRS forms a center of a cell, and wherein the spreading code sequence is adjusted such that the reference chip of the spreading code sequence corresponds to the VTRS.

3. The platform according to claim 1, wherein the VTRS is a virtual point on earth or in space.

4. The platform according to claim 1, wherein the signal generation unit is configured to adjust the spreading code sequence to ensure that the rising edge or the falling edge of the reference chip arrives at other Virtual Timing Reference Stations, VTRSs, at different predetermined times.

5. The platform according to claim 4, wherein a length of the spreading code sequence is based on a shortest distance between VTRSs of a set of VTRSs comprising the VTRS and the other VTRSs.

6. The platform according to claim 1, wherein the signal generation unit is configured to compensate for the clock offset between a satellite local time and a system time of a corresponding Global Navigation Satellite System, GNSS.

7. The platform according to claim 1, wherein the signal generation unit is configured to compensate for the tropospheric and ionospheric delay at the VTRS on the predetermined time (tref,VTRS).

8. The platform according to claim 1, wherein the transmitted spreading code sequence comprises a spreading code counter which comprises a number of spreading codes starting from a first spreading code which comprises the reference chip.

9. The platform according to claim 1, wherein the signal generation unit is configured to compensate Doppler at the VTRS.

10. The platform according to claim 1, wherein the VTRS is not a fixed point on earth, but a moving point.

11. The platform according to claim 1, wherein the platform is a space-based station.

12. The platform according to claim 1, wherein the platform is a near earth platform.

13. The platform according to claim 1, wherein the platform is a static terrestrial platform which is configured for terrestrial mobile network infrastructures.

14. A user device configured to receive the spreading code sequence from the platform according to claim 1 and further configured to perform acquisition based on the spreading code sequence, wherein the VTRS is a priori known by the user device.

15. The user device according to claim 14, wherein the VTRS forms a trajectory which is known to the user device, wherein an exact position on the trajectory is known, which corresponds to an arrival of the reference chip of the spreading code sequence.

16. The platform according to claim 11, wherein the space-based station comprises a Navigation Satellite at a Medium Earth Orbit, MEO, a Low Earth Orbit, LEO, or a GEO stationary satellite, GEO.

17. The platform according to claim 12, wherein the near earth platform comprises a High-Altitude Platform, HAPS, a stratospheric Balloon, or a Drone.

18. The platform according to claim 13, wherein the static terrestrial platform comprises a Base Transceiver Stations, BTS, a terrestrial Navigation Beacon, a Pseudo-satellite, or Pseudolite.

* * * * *